United States Patent [19]
Christopherson et al.

[11] Patent Number: 6,101,794
[45] Date of Patent: Aug. 15, 2000

[54] MOWER

[75] Inventors: Leslie J. Christopherson; Raymond A. Christopherson, both of Pardeeville, Wis.

[73] Assignee: Terracare Products Company, Inc., Pardeeville, Wis.

[21] Appl. No.: 09/090,010

[22] Filed: Jun. 3, 1998

[51] Int. Cl.[7] .............................. A01D 34/62; A01D 34/44
[52] U.S. Cl. .................................. 56/6; 56/13.4; 56/16.7; 56/295; 56/320.2; 280/124.179
[58] Field of Search .................................. 56/6, 16.7, 13.4, 56/255, 295, 320.1, 320.2, DIG. 10, DIG. 17, DIG. 20; 280/124.103, 124.106, 6.154, 124.179

[56] References Cited

U.S. PATENT DOCUMENTS

| | | |
|---|---|---|
| Re. 32,377 | 3/1987 | Seyerle . |
| 2,859,581 | 11/1958 | Kroll et al. . |
| 2,917,826 | 12/1959 | Pohr . |
| 2,920,436 | 1/1960 | Benson . |
| 3,078,573 | 2/1963 | Kern . |
| 3,292,945 | 12/1966 | Dangauthier . |
| 3,555,798 | 1/1971 | Eder . |
| 3,681,903 | 8/1972 | Phillips . |
| 3,686,840 | 8/1972 | Root . |
| 4,090,346 | 5/1978 | Doi . |
| 4,121,405 | 10/1978 | Wolf . |
| 4,205,510 | 6/1980 | Raniero . |
| 4,254,607 | 3/1981 | Moore . |
| 4,356,686 | 11/1982 | Lessig, III . |
| 4,368,610 | 1/1983 | Aono . |
| 4,369,618 | 1/1983 | Dell . |
| 4,416,109 | 11/1983 | Slazas . |
| 4,426,831 | 1/1984 | Klas et al. . |
| 4,433,530 | 2/1984 | Schaefer . |
| 4,466,235 | 8/1984 | Cole . |
| 4,532,755 | 8/1985 | Schemelin et al. . |
| 4,621,699 | 11/1986 | Slazas . |
| 4,711,073 | 12/1987 | Freier, Jr. et al. . |
| 4,726,440 | 2/1988 | Kamlukin et al. . |
| 4,765,127 | 8/1988 | Hamblen . |
| 4,787,646 | 11/1988 | Kamlukin et al. . |
| 4,807,904 | 2/1989 | Kamlukin et al. . |
| 4,813,215 | 3/1989 | Chase et al. . |

(List continued on next page.)

OTHER PUBLICATIONS

"Grass–Cutting Basics for Rotary Mowers," *Outdoor Power Equipment*, Mar. 1993, pp. 58–64.

Primary Examiner—H. Shackelford
Attorney, Agent, or Firm—Boyle Frederickson Ziolkowski S.C.; David D. Stein

[57] ABSTRACT

A mower comprising a frame, a deck with a discharge located forwardly of at least one cutting blade, a baffle in the deck disposed between the blade and discharge that is spaced from the top wall of the deck defining a discharge aperture in the deck that creates suction and focuses clippings toward the discharge, and wheels coupled to the frame by a suspension preferably of independent construction. Each blade is massive for high inertia, generally planar, and disc-shaped having at least three cutting arms that each have a tab extending below the plane and having a cutting edge. Each arm preferably also has an upwardly extending suction-increasing flap. The suspension has a pair of control arms pivotally mounted to the frame with each arm having a mounting arm extending above the frame capturing a biasing element that urges the arms away from each other to keep the wheels in contact with the ground. The deck is pivotally mounted to an arm that is pivotally mounted to the frame and urged upwardly by a torsion spring or the like such that it floats along the ground. The mower preferably is of rear wheel drive construction with the suspension coupling front wheels to the frame. The combination of these elements results in a mower capable of high quality cutting under a variety of cutting conditions over diverse terrain while minimizing scalping and power input.

60 Claims, 11 Drawing Sheets

U.S. PATENT DOCUMENTS

| | | |
|---|---|---|
| 4,914,894 | 4/1990 | Geiger . |
| 4,924,665 | 5/1990 | Crosley . |
| 4,938,012 | 7/1990 | Klima . |
| 5,035,108 | 7/1991 | Meyer et al. . |
| 5,094,065 | 3/1992 | Azbell . |
| 5,142,851 | 9/1992 | Lydy et al. . |
| 5,321,940 | 6/1994 | Peterson . |
| 5,327,710 | 7/1994 | Plamper et al. . |
| 5,363,636 | 11/1994 | Lamoureux . |
| 5,375,400 | 12/1994 | Darden . |
| 5,383,329 | 1/1995 | Cornell, III et al. . |
| 5,410,866 | 5/1995 | Long . |
| 5,473,873 | 12/1995 | Sheldon . |
| 5,561,972 | 10/1996 | Rolfe . |
| 5,845,475 | 12/1998 | Busboom et al. . |

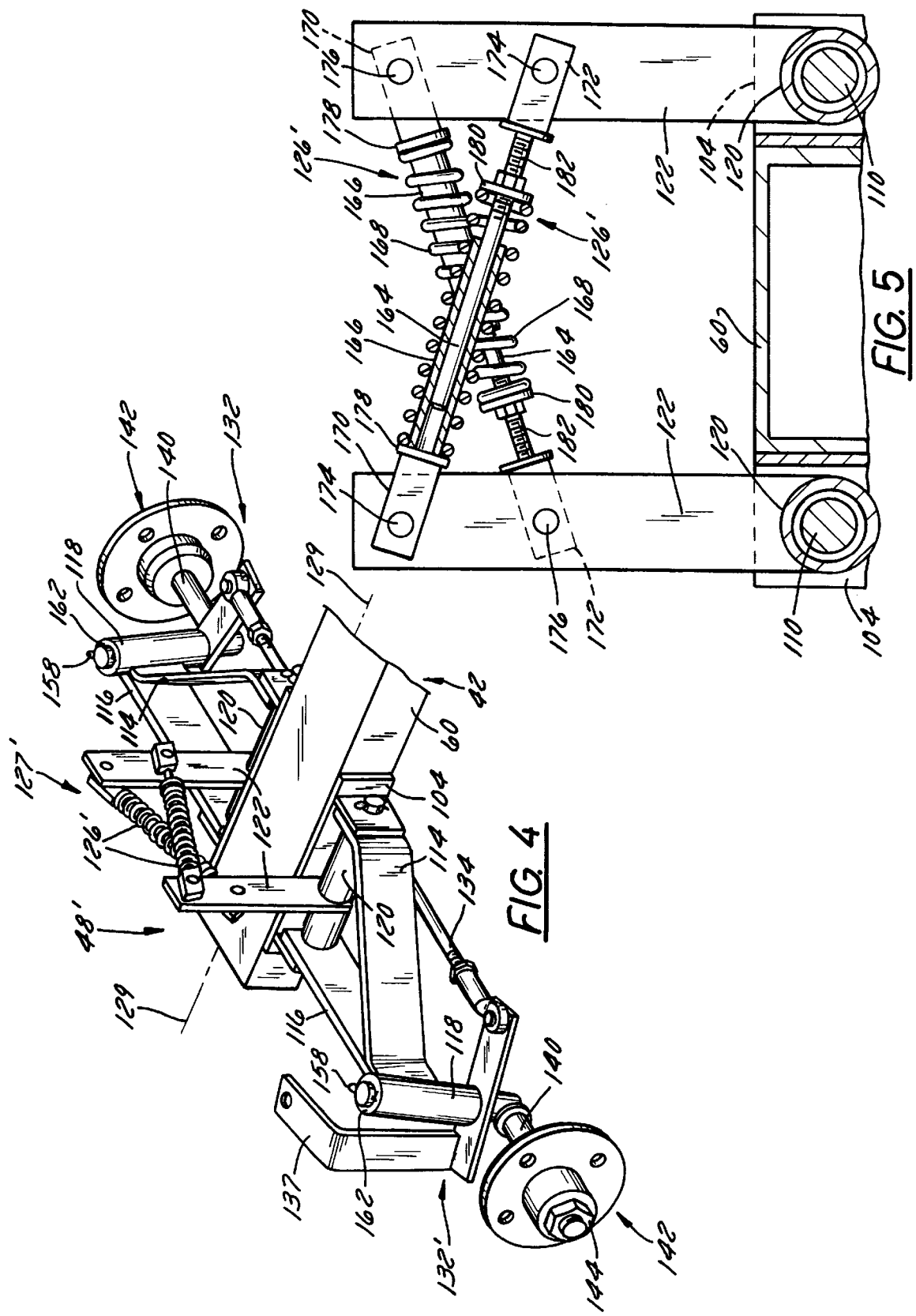

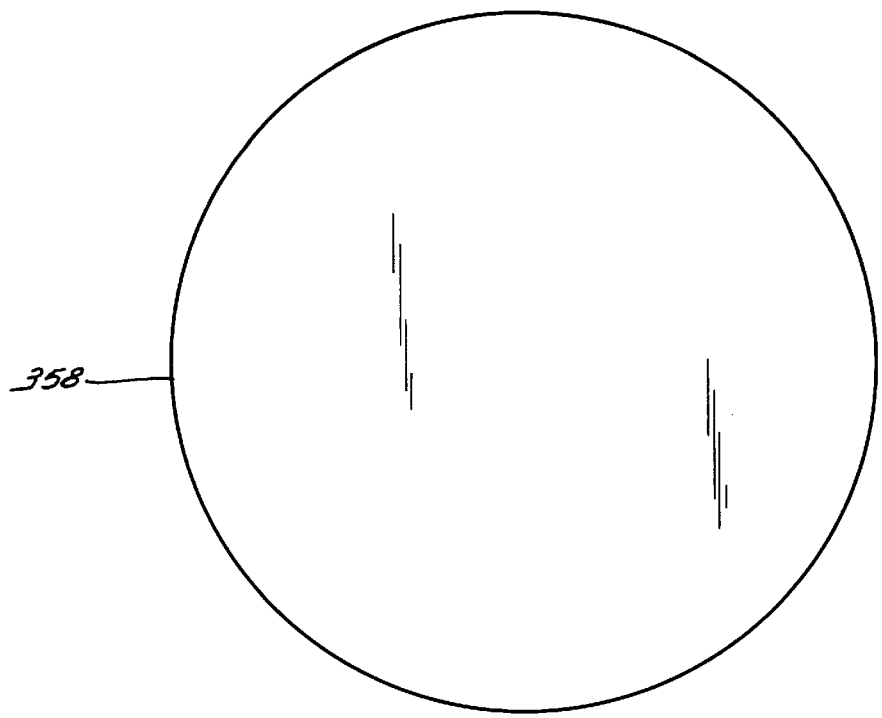
FIG. 13
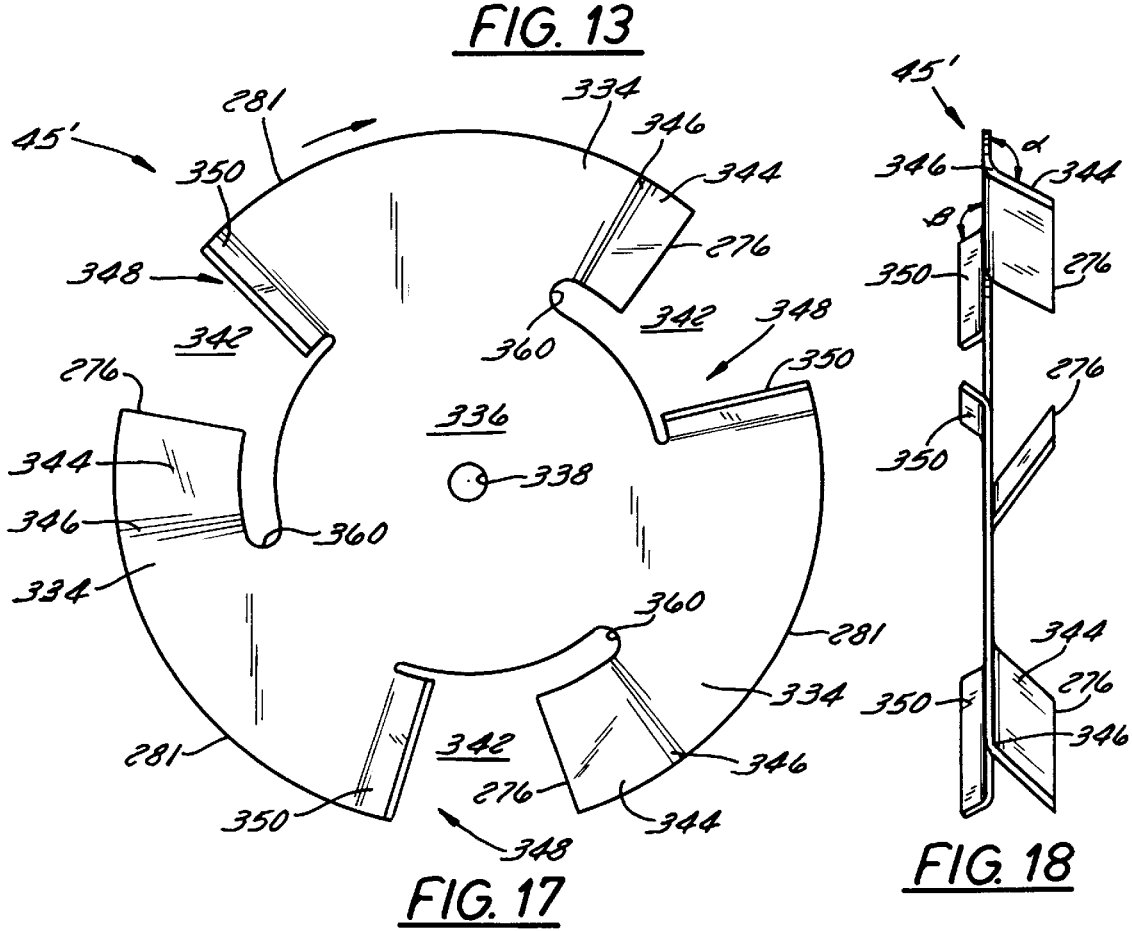
FIG. 17
FIG. 18

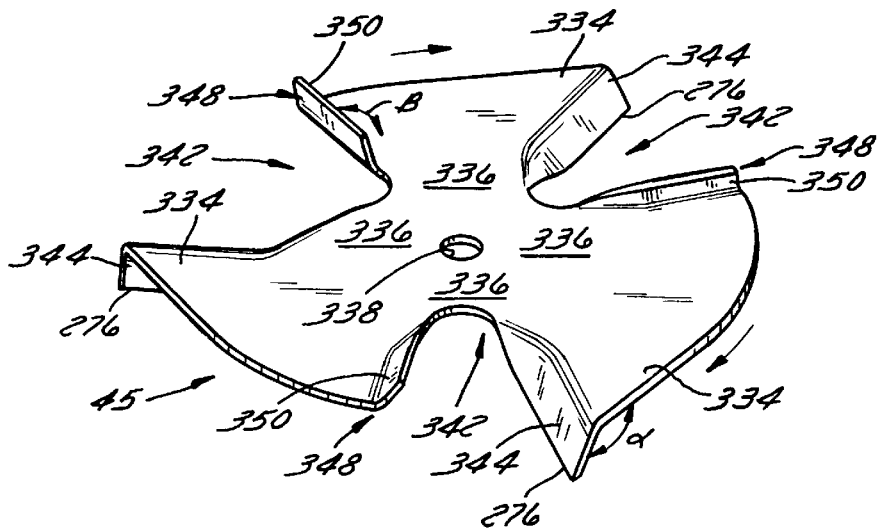
FIG. 15
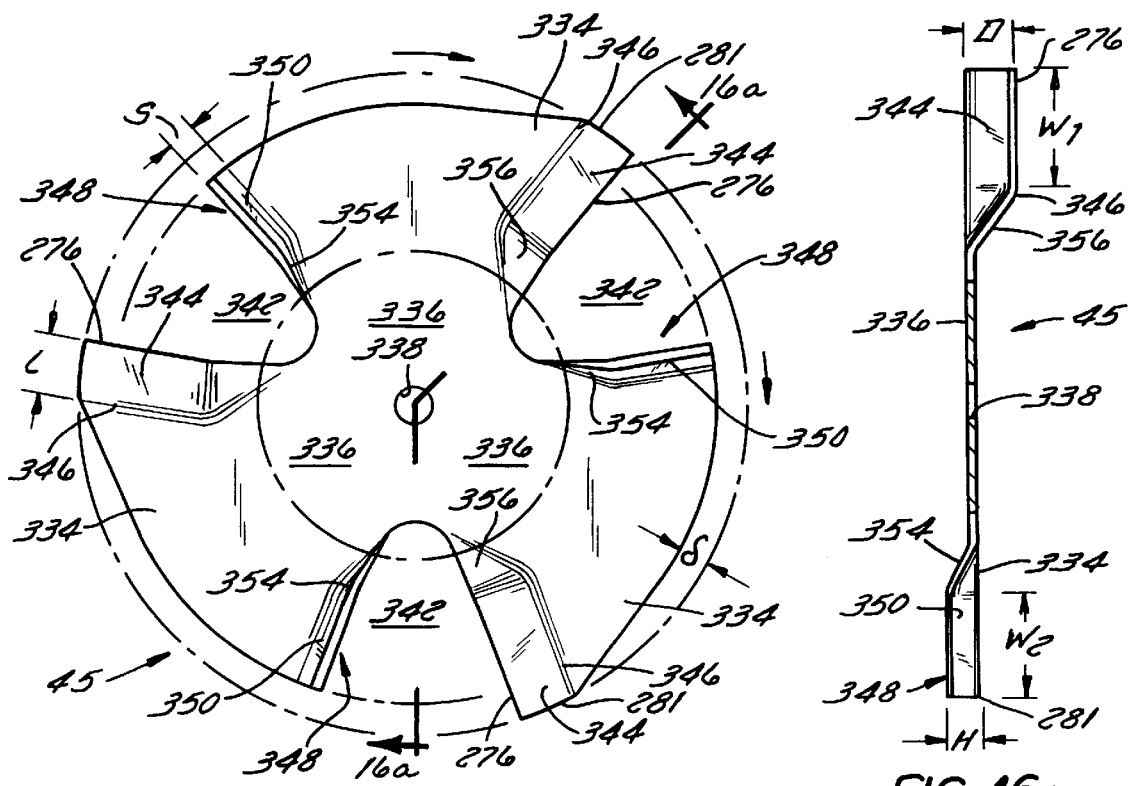
FIG. 14
FIG. 16a

MOWER

FIELD OF THE INVENTION

This invention relates generally to a mower for cutting grass and the like and more particularly to a mower, deck, suspension, and cutting blade capable not only of fine cutting and manicuring but also capable of cutting moist grass, brush, weeds, and saplings, for example, all while lessening the power required to rotate the blade.

BACKGROUND OF THE INVENTION

Most mowers today use elongate and generally rectangular cutting blades having a sharpened cutting edge at each end leading the direction of rotation of the blade which cuts the grass it contacts. Smaller mowers for residential use typically have a single deck which houses a single cutting blade with a side discharge chute through which cut grass is expelled. Commercial mowers are used on golf courses, cemeteries, and parks, and typically use a larger deck housing a longer blade. Many commercial mowers use two or three such decks ganged together such that the cutting blade of each deck is simultaneously driven by an internal combustion engine mounted to the frame of the mower. In some instances, each deck can be equipped with two or more cutting blades.

For safety reasons, federal law prohibits the speed of the outer tip of the rotating cutting blade from exceeding 19,000 feet per minute. For a mower moving at five miles per hour (440 feet per minute) using conventional rectangular cutting blades each having two cutting edges with one cutting edge disposed adjacent one end of the blade and the other cutting edge disposed adjacent the other end of the blade and rotating at a speed such that each blade tip is moving at a velocity of about 19,000 feet per minute, the following analysis applies:

30 inch blade
2021 R.P.M.=4043 cuts/minute=1.306" cut per blade revolution
21 inch blade
2878 R.P.M.=5757 cuts/minute=0.917" cut per blade revolution
15 inch blade
4043 R.P.M.=8085 cuts/minute=0.653" cut per blade revolution
10 inch blade
6129 R.P.M.=12,258 cuts/minute=0.431" cut per blade revolution In general, it is desirable to take smaller bites or cuts per blade revolution because it results in a better quality cut and result in smaller pieces of cut grass which are easier to discharge and lessen clogging.

However, rectangular cutting blades possess less material resulting in less inertia requiring more horsepower to maintain their speed of rotation at the desired. Moreover, since they have only two cutting edges, they must take larger bites or cuts per blade revolution. Quite often, because the effective cutting region of the blade is much smaller than the actual length of the cutting edge, blade wear occurs much more rapidly at the tips where cutting is taking place. As a result of all of these factors, the cutting efficiency of conventional rectangular blades is less than optimum and blade wear along the blade's effective cutting region rapidly reduces during operation.

As a result of lower blade efficiency and increased wear, the quality of cut is significantly less than desired. More particularly, the grass is not cleanly cut and is often frayed or ragged. This poor cut damages the grass causing its cut tips to turn brown in less than a few days. This premature and unnecessary browning of the grass is particularly undesirable on golf courses and cemeteries where appearance is important. Moreover, for golf courses, a precise and uniform cut is highly desired so that golf balls roll uniformly on all of the fairways of the course.

To better nourish the grass, mulching or recirculating mowers are in favor. Most, if not virtually all mulching mowers utilize a deck that lacks any discharge chute for capturing the cut grass clippings within the deck. In mulching, it is desirable to cut the grass clippings into as small of pieces as possible so they will fall between the uncut grass blades to the ground to avoid messy clumps of clippings from accumulating on top of the grass. Additionally, smaller grass clippings are more desirable because they degrade more quickly returning nutrients to the ground more rapidly.

Unfortunately, mulching mowers often lack sufficient suction to keep cut grass clippings suspended within the deck long enough to be recut into sufficiently small pieces. Moreover, cut clippings disposed near the rear of the deck can fall to the ground after only being cut once reducing their efficiency as mulch because the clippings are so large.

Many commercial and home mowers of the tractor and/or triplex variety have two front wheels, two rear wheels and are of front wheel drive and rear wheel steer construction for better maneuverability. Unfortunately, such tractor-type mowers possess less traction and are thus less suitable for mowing grass on hills and other types of uneven terrain, such as what is commonly found on golf courses.

Traditionally, triplex mowers have been used in many forms for many years, but only with reel mowers. These are large acreage commercial mowers that use three cutting decks with each deck being from four to six feet long. Each deck has two or three rectangular cutting blades each of which typically is twenty to twenty four inches long. Unfortunately, because these decks are so large and particularly because they are so long, they can cause scalping and an uneven cut particularly when mowing uneven, rough or hilly terrain.

What is needed is a mower which uses a more efficient cutting blade for producing a better quality cut while increasing cutting efficiency and minimizing horsepower demands upon the internal combustion engine driving the mower. What is needed is a cutting blade offering more than two cutting edges to decrease the length of grass cut per blade revolution for increasing cut quality. What is also needed is a cutting blade of aerodynamic construction that lessens the power required to rotate it at a desired rotational speed. What is also needed is a cutting blade having greater inertia for being able to encounter cutting obstacles and still maintain cut quality. What is also needed is a mulching or recirculating mower deck which discharges cut grass clippings forwardly to better ensure the cut clippings are recut into smaller clippings to produce better mulch. What is further needed is a mower of tractor-type construction having improved traction and stability for enabling the mower to better maneuver and more uniformly cut grass on uneven and hilly terrain. What is still further needed is a commercial triplex mower which uses smaller cutting blades and cutting decks that float along the terrain to minimize scalping and uneven cutting.

SUMMARY OF THE INVENTION

A mower, deck, suspension, and cutting blade each separately and together in combination of novel construction that produces a high quality and fine cut that is suitable not only for general cutting applications but is also well suited for more demanding cutting applications including golf courses, parks, cemeteries and the like. The mower preferably is of rear wheel drive construction and preferably has an independent front suspension of compact construction imparting to the mower excellent stability over uneven terrain enabling the mower to minimize and preferably substantially prevent scalping. The mower has at least one mower deck of novel forward or front discharge construction for facilitating a high quality cut and which also mulches cuttings. The deck has at least one cutting blade that is disc-shaped and sufficiently massive for maximizing rotational inertia during cutting to maintain blade rotational speed to ensure a consistently high quality and precise cut even after encountering cutting obstacles, such as rocks, hills and the like, or when cutting organic material that is thicker, moister, denser or tougher than grass.

In one preferred embodiment, the mower is of ganged-deck construction having at least two and preferably at least three mowing decks. Each cutting deck has at least two and preferably three disc-shaped cutting blades. Preferably, each cutting blade has more than two spaced apart cutting arms with each arm equipped with a cutting edge for cutting smaller but more frequent bites of grass during each blade rotation which results in less blade wear and better quality of cut. Its high mass, high inertia construction produces a disc-shaped cutting blade that is energy efficient while able to crisply and precisely cut through a wide variety of organic materials with a minimum of loss of rotational speed and cutting inertia.

In one preferred embodiment, the mower preferably is a riding, tractor-type mower having a pair of front wheels and at least one driven rear wheel carried by a longitudinally extending chassis or frame. Preferably, both front wheels can be steered to maneuver the mower. If desired, the mower can be steered by a single front wheel or one or more rear wheels.

Its front suspension is independent having a biasing element disposed across the frame adjacent the front of the mower that cooperates with both front wheels. Preferably, the biasing element overlies a portion of a central longitudinally extending support beam of the mower frame.

Each front wheel is mounted to a control arm that is pivotally attached to the frame. Preferably, each control arm has an upstanding lever arm or the like that functions as a biasing element mount. When assembled, the biasing element is mounted to the lever arm of both control arms. In its preferred embodiment, each lever arm locates the biasing element above and at least partly over a portion of the beam of the frame.

In one preferred independent suspension embodiment, the suspension has a single biasing element overlying the frame and in cooperation with both control arms. In another preferred suspension embodiment, the suspension has a pair of biasing elements. Where two or more biasing elements are used, pairs of biasing elements are arranged generally in a criss-cross pattern or "X" arrangement between the control arm mounts.

The biasing element is constructed to urge the control arms away from each other toward the ground helping to maximize wheel contact with the ground during mowing. Preferably, the biasing element urges the control arms apart by resisting compression of the biasing element. In its preferred embodiment, the biasing element is compressible and absorbs shocks, such as due to vibration, bumps, hills and other uneven terrain, to help promote stability of the mower.

In one preferred embodiment, the biasing element comprises a spring that preferably is of coil construction. A rod can be telescopically received within the spring. If desired, the rod can be telescopically received in a sleeve with the rod having an adjustable flange or nut against which one end of the spring seats that can be moved axially along the rod to change the compression of the spring. If desired, the biasing element can be a strut, shock absorber, or gas spring forming the biasing element.

The mower deck has a top wall, at least one sidewall and, if desired, a front wall, with each cutting blade disposed inside the deck. Inside the deck, each cutting blade is received in a cutting chamber that is smaller than the deck. The cutting chamber is defined by a portion of the deck sidewalls and a front baffle within the deck that helps to increase cutting efficiency, boost upward cutting suction, and direct the cuttings in the desired direction to expel them from the deck. The rear of the cutting chamber can be defined by a rear sidewall of the deck.

Offset from at least a portion of the rear wall of the deck can be a rear baffle that defines a portion of the cutting chamber and that is spaced rearwardly from each cutting blade so as not to contact the blade during rotation. The baffle extends downwardly from the top wall to adjacent the edges of the rear wall and sidewalls. In its preferred embodiment, the rear baffle is curved around a portion of the outer periphery of each blade or the rotational path defined by each blade during operation. Preferably, the baffle extends from sidewall to sidewall of the deck and can be formed from a portion of the rear wall. Preferably, its central portion is spaced from the deck rear wall. In a preferred deck embodiment having three cutting blades, the rear baffle has three curved segments with each segment curved around a portion of the periphery of its adjacent cutting blade. If desired, the deck rear wall can be curved around each blade and spaced from each blade in such a manner so as to function the same as the rear baffle.

In another preferred deck embodiment, the rear wall is contoured around the blades to increase suction and has a front discharge baffle disposed between a discharge located forwardly of the cutting blade or cutting blades. The front baffle is spaced from the top wall defining a discharge aperture that helps increase suction and focus clippings expelled from the cutting chamber toward the forwardly located discharge.

Spaced from the deck front wall is the front discharge baffle located in front of each cutting blade and that has at least some portion of it spaced from the top wall defining with the deck sidewalls and top wall a discharge aperture through which cuttings are expelled during mowing. The front baffle is spaced only a few inches and preferably no more than 2 inches from the periphery of each blade to help maximize cutting suction. The front baffle extends from one deck sidewall to the other deck sidewall. Preferably, the front baffle is continuous and generally straight. In another preferred embodiment, the front baffle is curved and can be formed of straight segments arranged to generally form an arc or curve.

Together, portions of both deck sidewalls, the deck rear wall, and front baffle closely frame the cutting blades thereby creating a cutting chamber that maximizes cutting suction which preferably increases cutting efficiency, quality and consistency. Preferably, the cutting chamber houses at least two cutting blades. In its preferred embodiment the cutting chamber houses three cutting blades each of which preferably are of generally round disc-shaped construction.

Cuttings are discharged from the deck forwardly of the cutting blades defining a cutting deck of forward discharge construction. In one preferred embodiment, the front wall of the deck functions as a deflector to deflect cuttings downwardly into the ground in front of the blades so they are recut when the blades pass over the cuttings. To achieve this, the front wall can be curved or segmented to generally form an arc or curve with its bottom edge disposed adjacent the ground.

In another preferred embodiment, the front wall has a forwardly facing discharge port generally inline with the discharge aperture of the cutting chamber. To help direct cuttings into the ground, the wall includes a flap that is spaced from and extends downwardly over at least a portion of the front-facing discharge port to absorb momentum of cuttings expelled from the deck and help direct the cuttings toward and preferably into the ground.

In a third preferred embodiment, there is an opening in each sidewall, preferably adjacent the deck front wall, that is located forwardly of the cutting blades thereby forwardly discharging cuttings sideways from the deck. Preferably, a deck of this preferred construction has a discharge opening in each sidewall.

The blades are preferably arranged in a staggered pattern. In a preferred arrangement, the deck has three blades with at least one of its blades staggered forwardly or rearwardly relative to another of the blades. In one preferred embodiment, the outer blades are forwardly staggered. In another preferred embodiment, the outer blades are rearwardly staggered. Preferably, the blades are staggered such that the cutting path defined by each blade slightly overlaps without adjacent blades ever coming into contact with each other.

Where the deck is mounted to a riding or tractor-type mower, the deck is pivotally mounted so as to float over hills, mounds and other uneven terrain. Where the mower is of multi-deck ganged construction, each deck is pivotally mounted to an arm that is in turn pivotally mounted to the frame of the mower. A torsion spring cooperates with the arm and frame to urge the deck away from the ground to help the deck "float" above the ground to minimize scalping and the like.

To help support the deck when mounted to a riding or tractor-type mower, the deck preferably rides on its own wheels or rollers. The wheels or rollers are height adjustable to help set the cutting height of the deck. Preferably, the rollers are carried on an axle that can be pivotally mounted by arms to each deck sidewall.

While the cutting deck of this invention is well suited for riding mowers or tractor type mowers, the deck is also well suited for push-type mowers that can be self-propelled.

The preferred cutting blade is generally round and disc-shaped with a plurality of circumferentially spaced cutting arms each carrying a cutting edge. Each pair of adjacent cutting arms is separated by a cutting notch through which cuttings are propelled after being cut. The cutting arms and notch between each pair of cutting arms creates suction that pulls the cuttings upwardly and out of the path of the blade after being cut. The cutting arms and cutting notches help the blade to act as a blower or fan that propels the cuttings upwardly and out the deck efficiently, requiring less power to do so.

Each cutting arm has a leading edge and trailing edge. The cutting edge is carried by the leading edge. The trailing edge has an upwardly extending flap that enhances cutting suction preferably while also acting as an airfoil to reduce aerodynamic drag on the blade. By increasing suction while preferably also reducing aerodynamic drag, the cutting blade is more easily maintained at the desired rotational cutting speed and consumes less power to rotate the blade. Preferably, the flap is angled upwardly and extends radially outwardly from adjacent the end its adjacent cutting notch to about the outer periphery of the blade.

To lessen wear, the cutting edge is disposed below the disc preferably below the plane of the disc. The cutting edge is carried by a downwardly extending cutting tab of the cutting arm. The disc-shaped blade preferably is constructed such that a portion of the cutting edge, preferably the outer periphery of the cutting edge, is radially outwardly offset from the trailing flap of the same arm. Offsetting the cutting edge radially outwardly preferably results in cutting before the grass contacts the remainder of the blade further lessening "grass" drag on the blade which allows the blade to cut more efficiently using less power.

Each disc-shaped blade preferably has at least three cutting arms for producing at least one-third more cuts per blade rotation than a rectangular cutting blade of the same length as the diameter of the disc-shaped blade. While the preferred blade embodiment has three cutting arms, the disc-shaped blade can have more than three cutting arms. Preferably, the blade is symmetrical in construction with each of its cutting arms identical and substantially equiangularly circumferentially spaced. By its symmetrical construction, the disc-shaped cutting blade is better balanced than a rectangular blade of the same length as the disc-shaped cutting blade diameter lessening vibration and enabling the disc-shaped cutting blade to be rotated at higher speeds than a rectangular blade. The preferred embodiments of the disc-shaped blade also are safer because the downwardly extending cutting tab and edge tends to tumble rocks and other objects rather than pick an object up and throw it, as is the tendency of rectangular blades. Preferably, the blade also wears less, is more durable and lasts longer compared to conventional rectangular blades.

The disc-shaped cutting blade preferably is of high inertia construction such that the blade requires less power to maintain the blade at a desired rotational speed. Its high inertia construction enables the blade to maintain its rotational speed even when cutting material thicker, denser, tougher and harder than grass. The high inertia construction also enables the blade to pass through earth or throw rocks with a minimum of loss of rotational speed so that after the blade has passed through the cutting obstruction it still has sufficient rotational speed that it immediately thereafter crisply cuts grass minimizing scalping and the like. The high inertia results in the disc-shaped blade acting as a flywheel that resists changes in blade rotational speed even when the blade encounters thick organic material, rocks and the like.

The blade is constructed of a metal or other suitable material enabling it to be made sufficiently massive so as to impart to the blade the desired high inertia construction. Preferably, the blade is constructed of steel or a steel alloy. Preferably, the disc-shaped cutting blade has a weight-to-blade-diameter ratio of at least about 2.0 ounces per inch. Preferably, the disc-shaped cutting blade has a weight of at least about one pound and eight ounces for imparting sufficient mass such that the blade functions as a flywheel and thereby resists slowing its rotational speed even when encountering cutting obstacles such as earth, rocks, large sticks, and the like.

In a preferred implementation of the disc-shaped cutting blade, at least two blades are used in a cutting deck.

Preferably, three such blades are used. By using more than one blade per deck, blades having a diameter less than the width of the deck are used enabling each blade to be rotated at higher speeds further increasing the rotational inertia of the blade. Increasing rotational speeds also advantageously increases the number of cuts made by the blade per foot of forward movement of the mower resulting in a higher quality and cleaner or more precise cut.

Preferably, each disc-shaped blade is rotated at a speed of at least about 3,500 revolutions per minute. Preferably, each blade is rotated at a rotational speed no greater than that which results in the velocity of the outer radial tip of its cutting edge not exceeding 19,000 feet per minute. For a blade of about fifteen inches in diameter, the blade preferably is rotated at a speed of at least about 3,400 revolutions per minute. For a blade of about twelve inches in diameter, the blade preferably is rotated at a speed of at least about 3,800 revolutions per minute. For a blade of about ten inches in diameter, the blade preferably is rotated at a speed of at least about 4,500 revolutions per minute. For a blade of about nine inches in diameter, the blade preferably is rotated at a speed of at least about 5,000 revolutions per minute. Preferably, each blade is rotated no faster than about 6,500 revolutions per minute.

While the disc-shaped cutting blade is well suited for riding mowers and tractor-type mowers, the blade is also well suited for use with push-type mowers that can be self-propelled. The disc-shaped blade is also well suited for other cutting implements.

If desired, a blower can be mounted above the blade to the cutting blade to help increase cutting suction. The blower preferably comprises a disc with fins that each move air in the desired direction the cuttings are to be propelled.

Objects, features and advantages of this invention are to provide a mower, deck, suspension, deck, and blade that cuts with precision and high quality at high mower velocities as high as five miles per hour or greater; that maintains cutting precision and quality while cutting over uneven terrain and through obstacles; that maintains a relatively constant cutting blade rotational speed; that cuts grass more precisely in a manner that minimizes damage to each blade of grass which results in grass that does not brown; that minimizes damage to grass resulting in a lawn that is greener even during low moisture and drought soil conditions; that maintains a high rotational cutting blade speed using a minimum of power; that efficiently cuts, lifts and propels cuttings out the deck using less power; and is a mower, suspension, deck and blade that each is strong, rugged, easy to assemble, durable, of simple design, compact construction, economical manufacture and which is easy to use and operate.

BRIEF DESCRIPTION OF THE DRAWINGS

These and other objects, features, and advantages of this invention will become apparent from the following detailed description of the best mode, appended claims, and accompanying drawings in which:

FIG. 4 is a partial perspective view of a second preferred embodiment of an independent front suspension of the mower;

FIG. 5 is a sectional view of the suspension showing in more detail a compact shock absorbing assembly of the suspension;

FIG. 13 is a top view of circular blank from which the disc-shaped cutting blade is constructed;

FIG. 14 is a top view of one preferred disc-shaped cutting blade embodiment which results after stamping and forming the blank;

FIG. 15 is a perspective view of the disc-shaped cutting blade;

FIG. 16A is a cross sectional view of the cutting blade taken along line 16A—16A of FIG. 15;

FIG. 17 is a top view of a second preferred disc-shaped cutting blade embodiment; and FIG. 18 is a side view of the first disc-shaped cutting blade embodiment.

DETAILED DESCRIPTION OF THE INVENTION

Introduction

Figure 1:
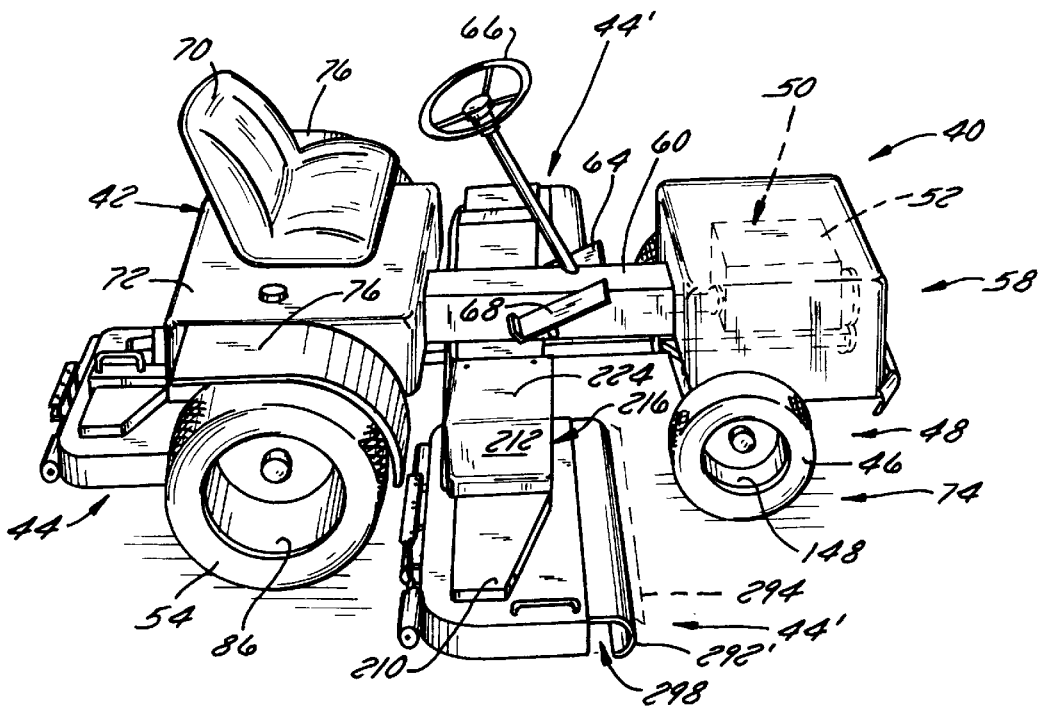
FIG. 1 is a perspective view of a mower of this invention.
Figure 2:
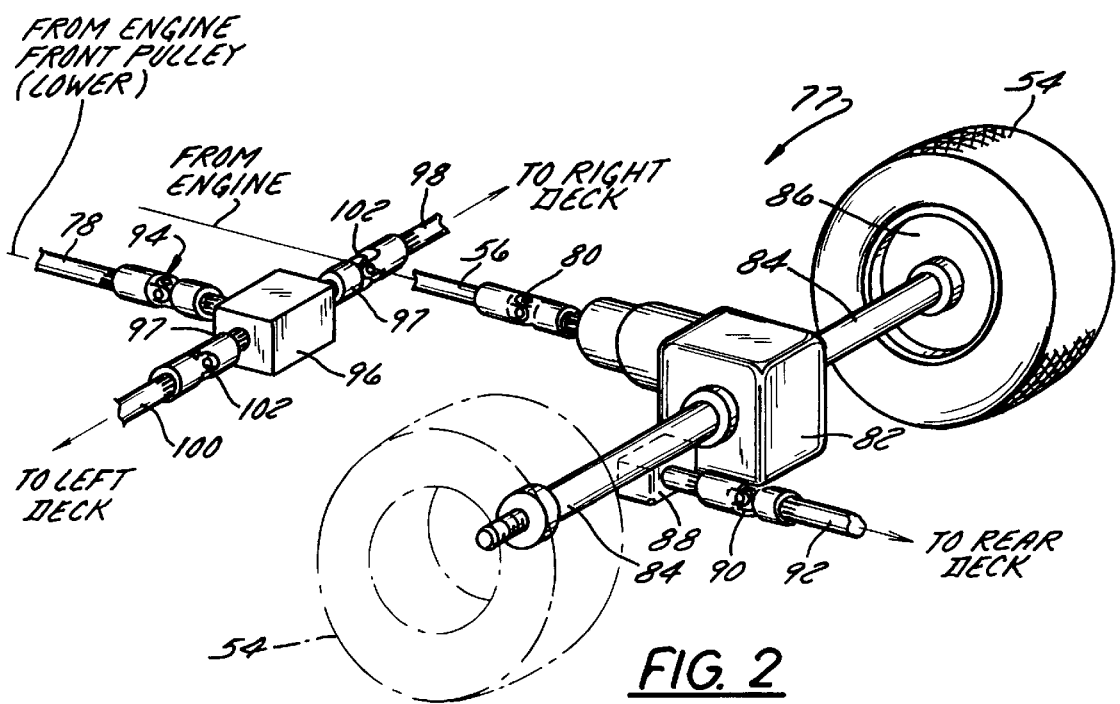
FIG. 2 is a partial fragmentary view of the drive train of the mower coupled to the rear wheels and mowing decks.
Figure 3:
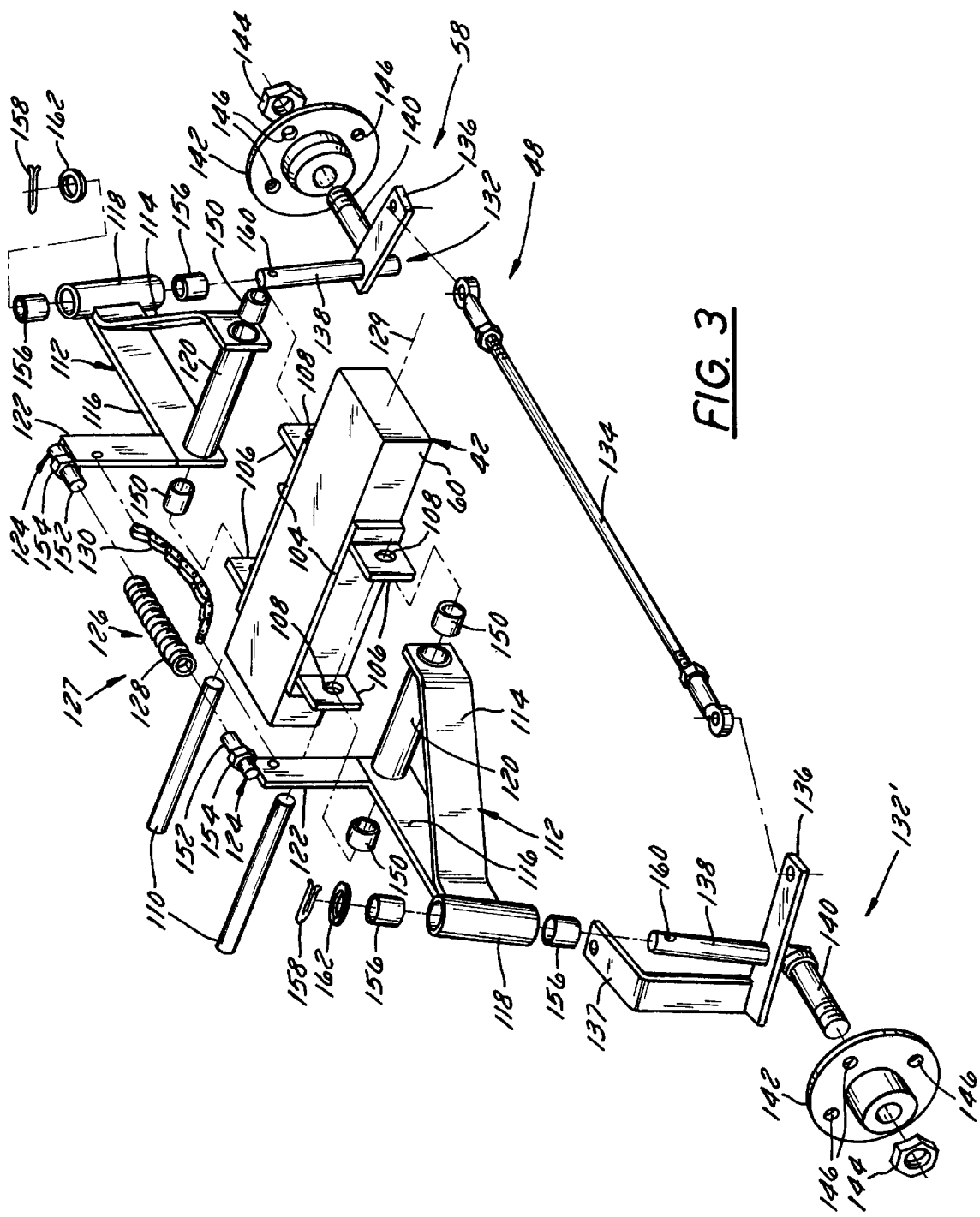
FIG. 3 is an exploded view of a preferred embodiment of an independent front suspension of the mower.

FIGS. 1–3 illustrates a mower 40 of this invention that preferably is a riding mower or tractor-type mower. The mower 40 has a frame 42 from which are suspended three spaced apart mowing decks 44 and 44' that are each preferably of forward or front discharge construction and which can recirculate or mulch cut grass. Each deck 44 and 44' preferably has a plurality of disc-shaped blades 45, each of which are of integral or unitary and high inertia construction for cutting grass, weeds, heavy brush, and small diameter trees all while minimizing scalping and power consumption.

The mower frame 42 has a pair of front wheels 46 attached to an independent front suspension 48 secured to the frame 42 for better resistance to tipping of the mower 40 when traveling over rough, hilly or uneven terrain. The independent front suspension 48 preferably also helps to improve the quality of cut while travelling over rough, hilly or uneven terrain. The mower 40 has a prime mover 50 that preferably is an internal combustion engine 52 coupled to a pair of spaced apart rear wheels 54 by a drive shaft 56. The prime mover 50 can also be an electric motor, hydraulic motor, or hydraulic pump.

The construction of the independent front suspension 48 is also advantageous because it allows the engine 52 to be mounted to the frame 42 adjacent the front end 58 of the mower 40 with its drive shaft 56 mounted safely out of the way, shielded by the frame 42. Preferably, the engine 52 and frame 42 can be constructed such that the drive shaft 56 is completely recessed within an elongate longitudinally extending center support beam 60 of the frame 42 that can be of downturned U-shaped cross-section.

The mower 40 has a cowling 62 housing the engine 52. Adjacent the cowling 62 are a pair of spaced apart foot rests attached to the frame 42 with one foot rest 64 on one side of a steering wheel 66 and the other foot rest 68 on the other side of the steering wheel 66. Preferably, one foot rest 68 includes an accelerator for controlling the velocity and acceleration of the mower 40. Preferably, the other foot rest 66 includes a brake for decelerating and stopping the mower 40. Although not shown in the drawing figures, the steering wheel 66 is coupled to the independent front suspension 48 in a manner which causes both front wheels 46 to turn substantially simultaneously in unison with rotation of the steering wheel 66.

Located rearwardly of the steering wheel 66 and between the rear wheels 54 is a seat 70 for supporting a driver (not shown) of the mower 40. The seat 70 rests on a seat platform 72 which preferably is part of the frame 42. The platform 72 can also be constructed and arranged to house a fuel tank (FIG. 1) for supplying fuel to the engine 52. Where the prime mover 50 is an electric motor (not shown), the mower 40 can be equipped with a plurality of batteries preferably safely stowed underneath the platform 72 and carried by the frame 42. To prevent each rear wheel 54 from propelling grass and other debris upwardly from the ground 74, there is a fender 76 extending outwardly from the frame 42 over each rear wheel 54. Although not shown in FIG. 1, the mower 40 can also be equipped with a fender of similar construction over each front wheel 46.

In one preferred embodiment, the mower 40 is of ganged construction having at least two decks 44 and preferably at least three decks 44 (triplex construction) to more efficiently mow a wider swath of grass. As is shown in FIG. 1, the mower 40 has a deck 44' on each side and also preferably a rear deck 44. The decks are arranged such that the cutting path of the side mounted decks 44' overlaps at least slightly the cutting path of the rear deck 44, even while the mower 40 is turning, to ensure a continuous and unbroken swath of cut from the outside edge of one side mounted deck 44' to the outside edge of the other side mounted deck 44'. Depending upon the width of cut desired, the mower 40 can be equipped with as many as five decks with one additional deck (not shown) mounted outwardly of one side mounted deck 44' and the other additional deck (not shown) mounted outwardly of the other side mounted deck 44'.

Referring to FIG. 2, the drive train 77 of the mower 40 includes the prime mover 50 and at least one coupling for transmitting power from the prime mover 50 to the rear wheels 54. Preferably the coupling includes a first drive shaft 56 rotatively coupling the engine 52 to the rear wheels 54 and a second drive shaft 78 rotatively coupling the engine 52 to the side mower decks 44' and rear mower deck 44.

The first drive shaft 56 is rotatively coupled by a universal joint 80 to a differential, transmission or transaxle 82 that preferably is a hydrostatic transaxle but can also be a conventional gear-type differential, transmission or transaxle also constructed to direct engine power along an axle 84 to each rear wheel 54. While the axle 84 can be directly attached to a rim 86 of the rear wheel 54 upon which a pneumatic tire 54 is mounted, it can also be attached to a drum carrying the rim 86 with each drum equipped with a braking assembly (not shown) to facilitate slowing and stopping of the mower 40.

Where three ganged mower decks 44 and 44' are used along with a hydrostatic differential, transmission or transaxle 82, the engine 52 preferably is at least a twenty horsepower engine 52 for providing sufficient power to move the mower 40 forward relative to the ground at a speed of at least about five miles per hour while rotating each cutting blade 45 of each mower deck 44 and 44'. Preferably, the mower 40 is equipped with a single internal combustion gasoline engine 52 having between about twenty and no greater than about thirty five horsepower for providing sufficient power to move the mower 40 along the ground 74 and drive each cutting blade 45 within a desired rotational speed range. In a preferred embodiment of a triplex mower 40 having rear wheel drive, an independent front suspension 48, and disc-shaped cutting blades 45, the engine 52 has no greater than about 23 horsepower.

The second drive shaft 78 is coupled by a universal joint 94 to a transfer case 96, preferably mounted to the underside of the frame 42, which directs power through a pair of transfer shafts 98 and 100 to each side mounted deck 44'. To help enable each deck 44' to float over uneven and hilly terrain, each transfer shaft 98 and 100 is coupled to an output stub shaft of the transfer case 96 by a universal joint 102. A pulley is mounted on transfer case 96 and a pulley is mounted on right angle gear box 88. A bolt is attached to the pulleys to drive rear mower 44.

Independent Front Suspension

One preferred embodiment of an independent front suspension 48 of the mower 40 is shown in more detail in FIG. 3A. The suspension 48 has a pair of spaced apart outwardly extending mounting brackets 104 each mounted to one side of the support beam 60 of the frame 42. Each bracket 104 has a pair of spaced apart outwardly extending arms 106 each having a generally coaxial bore 108 for receiving a pivot pin 110 which pivotally mounts a suspension control arm 112 to the bracket 104.

Each control arm 112 has a pair of braces 114 and 116 which converge at one end where they are attached to a generally vertically extending, yet slightly canted, steering knuckle sleeve 118. The braces 114 and 116 at their opposite end are spaced apart by and rigidly fixed to a journal bearing tube 120. Each brace 114 and 116 has an upwardly extending rigidly fixed lever arm 122 equipped with a seat 124 at its free end for receiving a resilient biasing element 126 of an over-frame compact shock absorbing assembly 127 that helps keep the front wheels 46 in contact with the ground 74 even while the mower 40 is travelling over rough or uneven terrain. The biasing element 126 preferably is constructed and arranged to also dampen shocks and bumps encountered during travel over rough and uneven terrain to help provide a smooth ride for the driver of the mower 40. To make the suspension 48 compact in construction, the biasing element 126 is located over the center support beam 60 of the frame 42 such that it extends across the central longitudinal axis 129 of the mower 40.

Preferably, the biasing element 126 is a coil spring 128 disposed between the lever arms 122 of both control arms 112 of the suspension 48 for resiliently urging each arm 122 about pin 110 toward the ground 74 yet permitting each arm 122 to pivot upwardly independently of the other arm 122 in response to rough or uneven terrain, hills, potholes and the like to advantageously maintain maximum contact of both front wheels 46 with the ground 74. If desired, the biasing element 126 can also be a gas filled automotive-type shock, a hydraulic cylinder, a dampener, a strut or another device capable of resiliently urging both control arms away from each in a manner which helps maximize front wheel contact with the ground 74.

To limit how far both control arms 112 can be pivotally displaced away from each other, the suspension 48 preferably includes a flexible connector 130, that preferably is a chain, a cable, wire, or a belt, that connects one lever arm 112 to the other lever arm 112. The connector 130 preferably is slack when the mower 40 is on level ground to permit the control arms 112 to move a limited amount away from each other when the mower 40 is traveling on rough or uneven terrain in a manner so as not to interfere with operation of biasing element 126. Depending upon the strength and construction of the biasing element 126, the control arm connector 130 may not be needed.

The suspension 48 further includes a pair of steering knuckles 132 and 132' interconnected by a tie rod 134 for turning the knuckles substantially in unison for smooth steering of the mower 40. Each steering knuckle 132 and 132' has a tie rod arm 136 and a cylindrical pivot stud 138 extending upwardly from the arm 136 with the stud 138 telescopically received in the steering knuckle tube 118 of one of the control arms 112.

A generally right angled steer bracket 137 fixed to one of the steering knuckles 132' is coupled to the steering wheel 66 preferably by a cable or link of a steering assembly, neither of which is shown by the drawings. Preferably, the steering assembly comprises a worm gear arrangement (not shown). If desired, the steering assembly can comprise a rack and pinion steering assembly or a power steering assembly.

Preferably, each tube 118 is canted to provide a desired amount of camber and mower wheel toe-in or toe-out. Extending outwardly from the bottom of the stud 138 is a stub axle 140 on which a threaded wheel mounting hub 142 is preferably removably mounted by a nut 144. The hub 142 preferably has a plurality of mounting holes 146 for receiving threaded lugs (not shown) to removably mount a front wheel rim 148 (FIG. 1) to the hub 142.

In assembly of the suspension 48, the control arm 112 is positioned adjacent one of the mounting brackets 104 such that its bearing tube 120 is disposed between the bracket arms 106 and aligned with the bores 108 in the arms 106. Pivot pin 110 is inserted through one of the arms 106, through the bearing tube 120, a nd through the other arms 106. To minimize friction between the pin 110 and tube 120 and preferably dampen vibration and noise, a pair of spaced apart bushings 150 are preferably received in each control arm bearing tube 120. At least one and two retainer pins can prevent removal of pin 110. Also to resist removal, the pin 110 can have a head (not shown).

With both control arms 112 pivotally mounted to the mower frame 42, the biasing element 126 preferably is mounted to and disposed between the lever arms 122. As is shown in FIG. 2, each biasing element seat 124 preferably is a generally cylindrical plug 152 telescopically received in one end of the biasing element 126 and has a head 154 larger than the inner diameter of the biasing element 126 for bearing against and limiting how far the plug 152 extends into the biasing element 126. Preferably, each end of the biasing element 126 is clamped or welded to one of the plugs 152 to fix each spring to a seat 124. If desired, the diameter of each plug 152 can be slightly larger than the inner diameter of the biasing element 126 so as to produce a tight friction fit between each plug 152 and biasing element 126 to fix the biasing element 126 to the plugs 152.

To assemble each steering knuckle 132 to one of the control arms 112, the pivot stud 138 is telescoped into the pivot tube 118. Preferably, there are a pair of spaced apart generally cylindrical and hollow friction reducing bushings 156 received in the tube 118 between the tube 118 and stud 138. A pin 158, such as a cotter pin, received through a bore 160 in each stud 138 after the stud 138 has been inserted into one of the tubes 118 prevents removal of the stud 138 from the tube 118. A washer 162 or the like preferably is received on each stud 138 between the pin 158 and upper axial end of the tube 118 for facilitating smooth turning movement. The tie rod 134 is similarly pivotally mounted at one end to one of the steering knuckles 132 and at its other end to the other of the knuckles 132'.

FIGS. 4–5 illustrate a second preferred embodiment of an independent front suspension 48' having a cross-linked shock absorbing assembly 127' of compact construction which is centrally located generally over the center support beam 60 of the frame 42 such that the shock absorbing assembly 127' crosses the central longitudinal axis 129 of the mower 40. The shock absorbing assembly 127' is disposed between lever arms 122 that rigidly extend upwardly from bearing tubes 120 of knuckles 132 and 132'. Preferably, each lever arm 122 is located adjacent the center of the tube 120 and rigidly fixed to the tube 120 such as by welding or the like.

The shock absorbing assembly 127' includes a pair of criss-crossed biasing elements 126' attached to the lever arms 122. Each biasing element 126' preferably comprises spring biased shock absorbing mechanism that includes a piston rod 164, attached to one of the lever arms 122, slidably telescopically received in a housing 166, attached to the other of the lever arms 122, with a spring 168 coaxially slidably carried on the housing. Preferably, both the housing 166 and the piston rod 164 have a tab 170 and 172 attached by a rivet 174 and 176 to one of the lever arms 122.

The spring 168, preferably a coil spring, is captured, preferably in compression, between a seat 178 on the housing 166 and a seat 180 on the piston rod 164. Preferably, at least one of the seats 178, 180 is axially adjustable to adjust the amount of precompression applied to the spring 168 enabling the firmness or softness and amount of effective travel of the suspension 48 to be selectively adjusted. As is shown in FIG. 5, seat 180 is threadably carried on a threaded portion 182 of the piston rod 164 thereby permitting axial adjustment of the seat 180 to adjust the amount of precompression of spring 168. To prevent the piston rod 164 from completely withdrawing from the housing 166, one end of the spring 168 is fixed to one of the seats 178 and the other end of the spring 168 is fixed to the other of the seats 180.

Preferably, the distance the biasing element 126' is mounted to lever arm 122 from the journal bearing tube 120 and the stiffness of the spring 168 are selected to provide optimum resistance to bumps while maximizing suspension stability. Preferably, the spring 168 is an Oshkosh Coil Spring, part number P#JN73535 made of steel that is 0.25 inch thick and which has a 1.17 inch diameter. If desired, each spring can have other thicknesses and diameters and can be made of other materials that need not necessarily be metal or of all-metal construction.

If desired, each biasing element 126', constructed to urge the lever arms 122 of the suspension 48' away from each other, can be a strut, such as a conventional automotive or truck strut, or a shock absorber. If desired, each biasing element 126' can be of gas or oil filled construction, such as a pneumatic or gas cylinder or a hydraulic cylinder.

During operation of suspension 48 and 48', its independent construction enables the mower 40 to absorb bumps and accommodate hilly terrain while facilitating mower stability such that the mower decks 44 and 44' cut uniformly and without scalping. By each control arm 112 being able to move relative to the other control arm 112, this stability is achieved. By providing at least one biasing element 126 or a pair of biasing elements 126' to urge both control arms 112 away from each other, the suspension also advantageously absorbs shocks and bumps to provide a smooth ride for the driver of the mower 40. By locating each biasing element 126 and 126' over the frame 42 of the mower 40, an independent suspension 48 of especially compact construction that is especially well suited for tractor-type mowers 40 is produced.

Mower Deck

Figure 6:
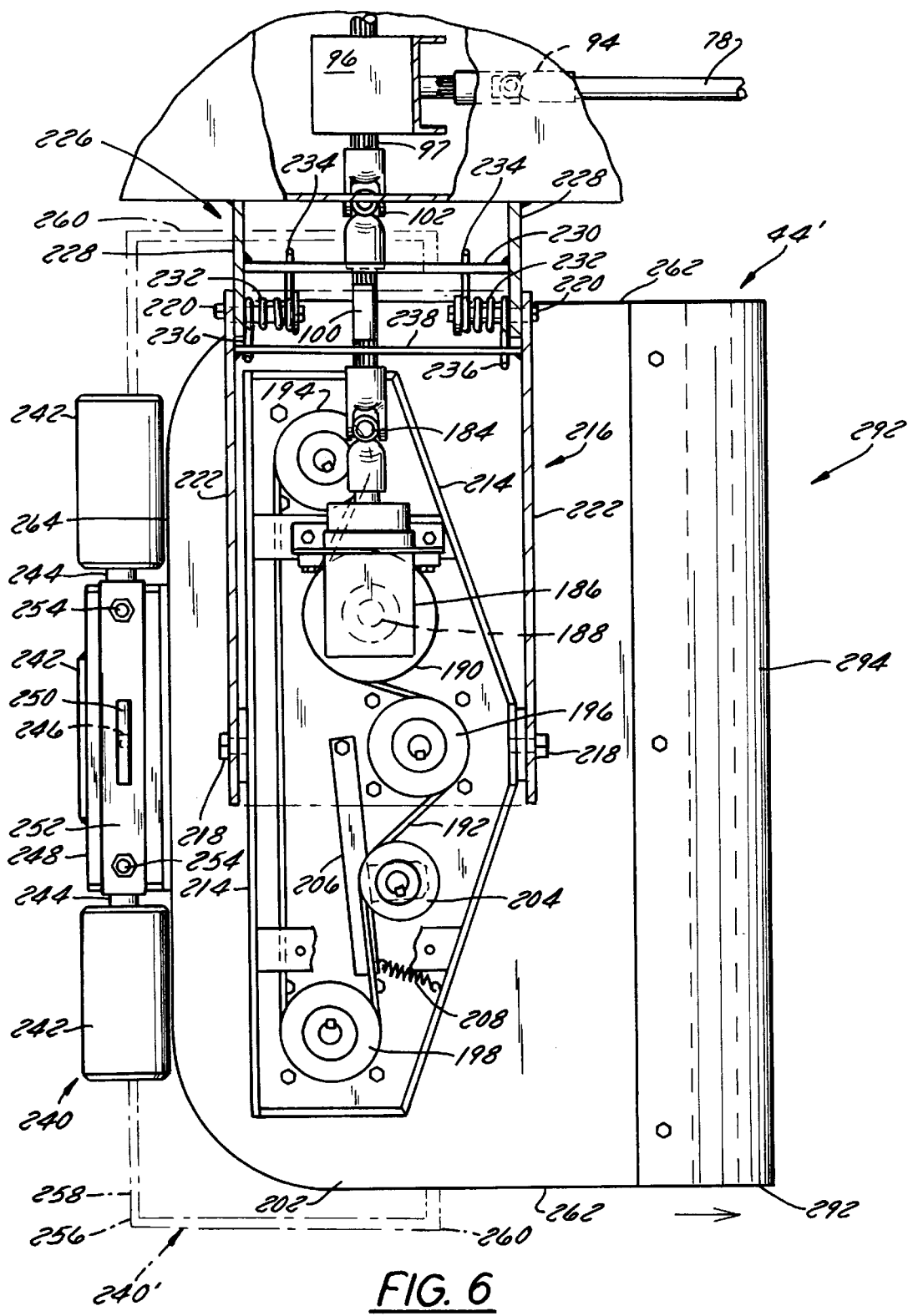
FIG. 6 is a top view of the mower deck.

FIGS. 6–9 depict in more detail the construction and arrangement of each mower deck 44 and 44'. Although the deck 44' shown in FIGS. 6, 7A and 7B is one of the side mounted decks, the rear deck 44 is substantially the same in construction and operation as the side mounted decks 44' such that only one such mower deck 44' will be hereafter described.

Figure 7A:
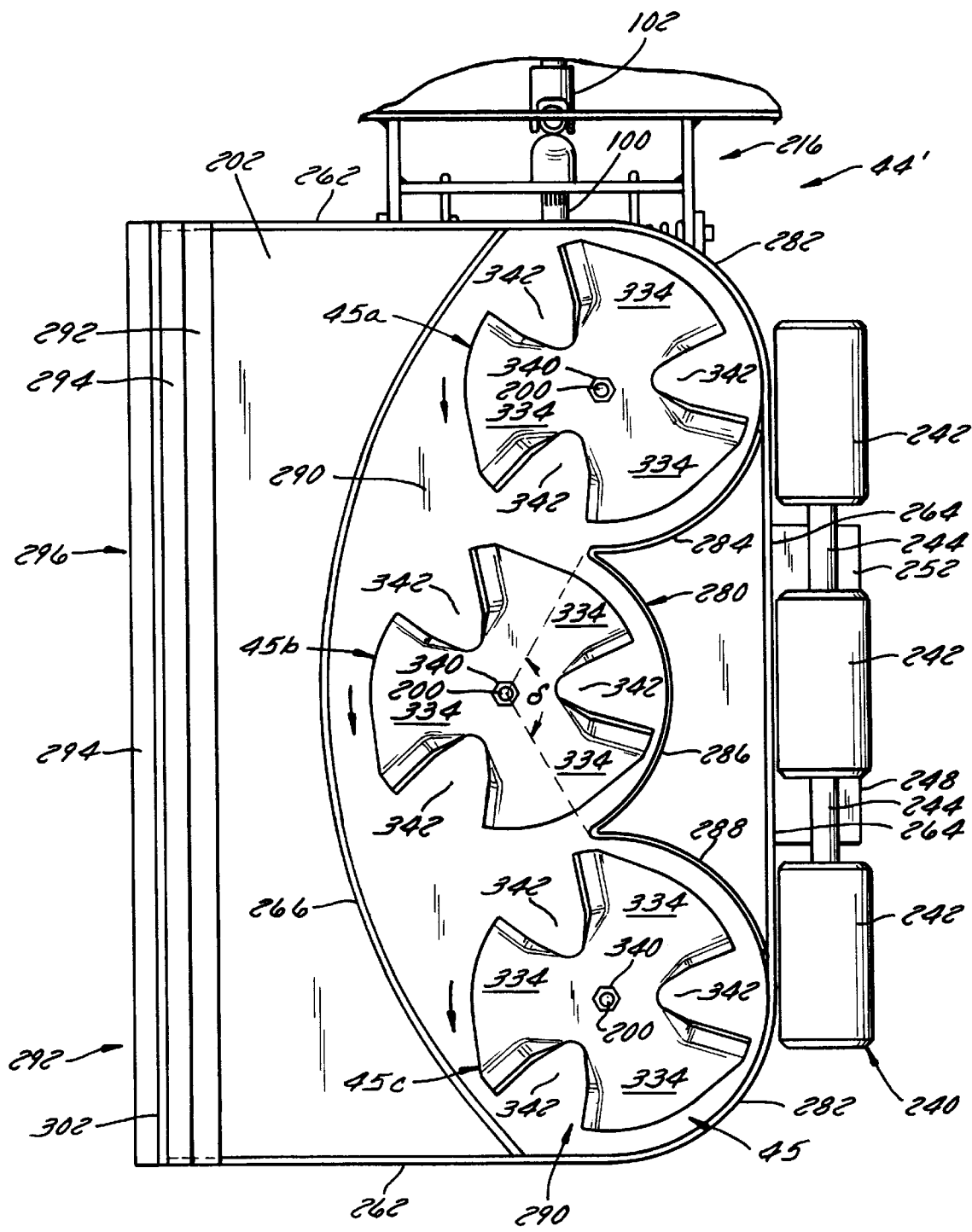
FIG. 7A is a bottom view of a first preferred embodiment of the deck illustrating a first preferred arrangement of its disc-shaped cutting blades.
Figure 7B:
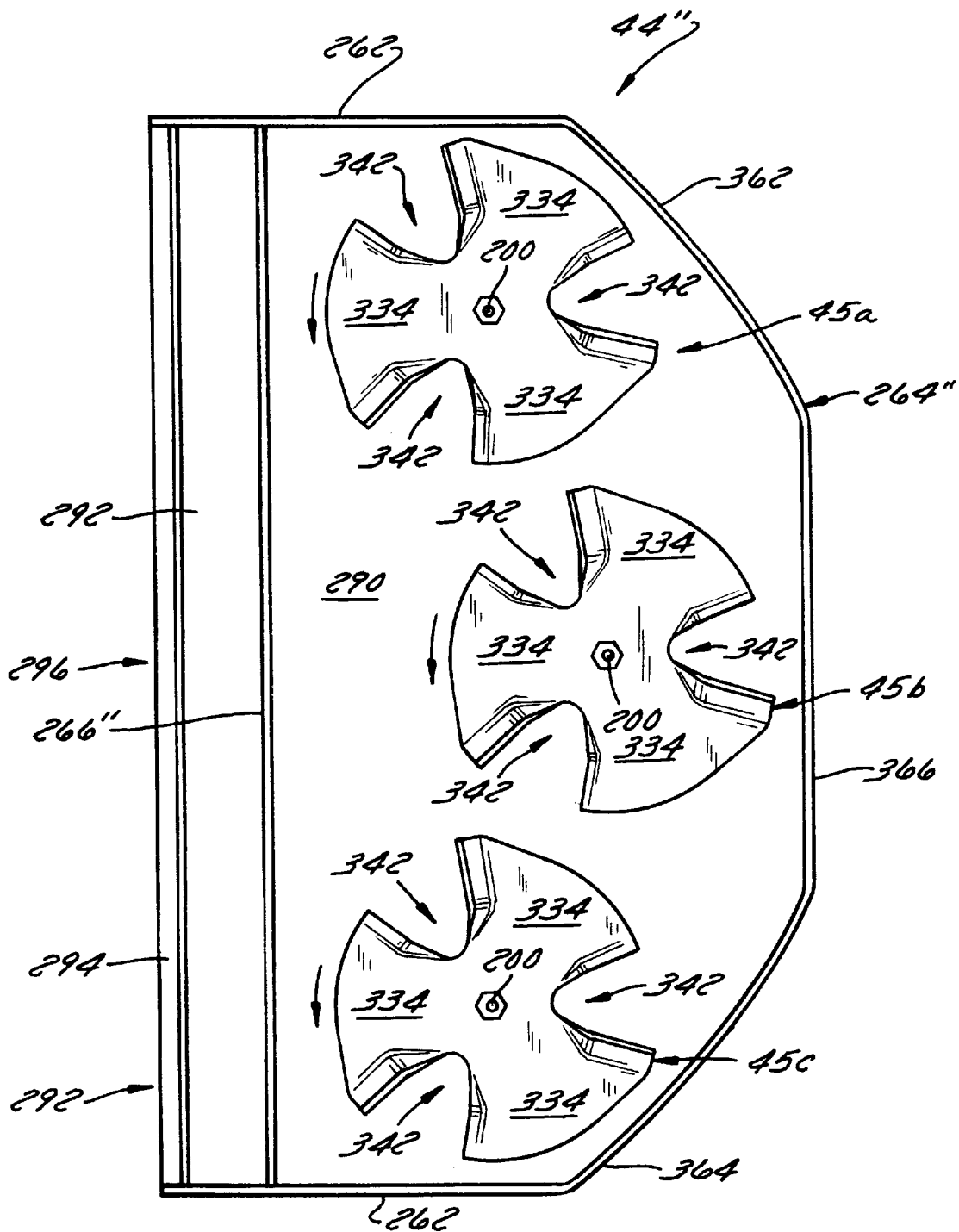
FIG. 7B is a bottom view of second preferred embodiment of the deck illustrating a second preferred arrangement of its disc-shaped cutting blades.
Figure 8:
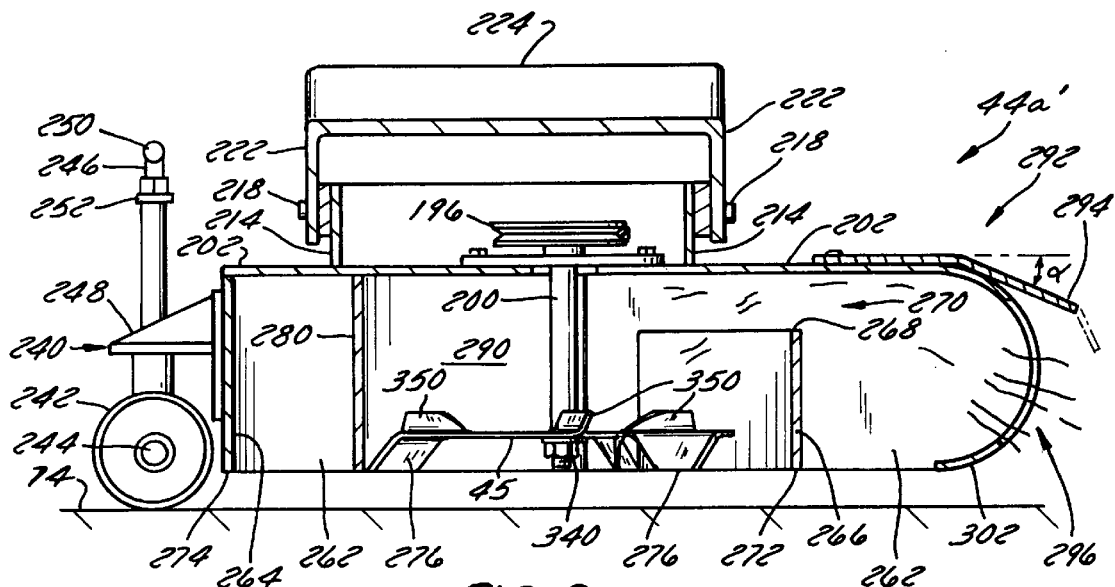
FIG. 8 is a side cross sectional view of a first preferred embodiment of the deck depicting its front discharge construction.

Referring to FIGS. 6, 7A and 7B, one end of power transfer shaft 100 is coupled by universal joint 102 to an output 97 of the transfer case 96 and its other end is coupled by another universal joint 184 to a right angled gear box 186 which has a downwardly extending output shaft 188 (in phantom) and a pulley 190 fixed to the shaft 188 for rotation preferably in unison therewith. The gear box 186 can be a gear reducer, for reducing the rotational speed of the output shaft 188 relative to the rotational speed of the power transfer shaft 100 but preferably is a gear multiplier for increasing the rotational speed of the output shaft 188.

An endless flexible member 192, that preferably is a belt received on pulley 190, transfers power from the output shaft 188 to each of three pulleys 194, 196, and 198, each fixed to one end of a cutting blade drive shaft 200 (FIGS. 8 & 9) journalled for rotation to a top wall 202 of the mower deck 44', or a bearing carried by the wall 202. To ensure optimum power transfer from the belt 192 to each of cutting blade drive shaft pulleys 194, 196, and 198, the deck 44' preferably has a belt tensioning pulley 204 carried by a bracket 206 and urged against the belt 192 by a spring 208.

Referring once again to FIG. 1, the deck 44' has an upstanding housing 210 that protects the belt 192 and pulleys 194, 196 and 198. A protective shroud 212 overlies the housing 210 and covers the belt 192 and pulleys 194, 196 and 198. As is shown more clearly in FIGS. 6–9, the housing 210 includes a pair of downwardly extending and spaced apart walls 214 fixed to the deck top wall 202.

The protective shroud 212 preferably is part of a deck mounting bracket assembly 216 that mounts the deck 44' to the mower 40 using spaced apart pivots 218 and 220 such that the deck 44' floats along the ground 74, even over uneven terrain, for minimizing and preferably substantially completely preventing scalping. The bracket assembly 216 is an arm 218 attached by a pair of spaced apart pivots 218 at one end to the sidewalls 214 of the deck housing 210 and is attached by a pair of spaced apart pivots 220 at its other end to the mower frame 42.

The bracket assembly 216 includes a pair of spaced apart elongate beams 222 preferably pivotally mounted to a mower deck anchor bracket 226 carried by the frame 42 and which is preferably fixed to the frame 42, such as by welding or the like. Preferably, each beam 222 is an integral component of the shroud 212, extending downwardly from the top surface 224 of the shroud 212. The anchor bracket 226 has a pair of spaced apart arms 228 interconnected by a brace 230. A torsion spring 232 around each pivot 220 has one tang 234 which bears against interconnecting brace 230 and has another tang 236 which bears against an adjacent brace 238 interconnecting the deck mounting bracket beams 222.

The springs 232 are constructed and arranged to help suspend the deck 44' above the ground, the springs 232 help prevent and minimize bouncing of the deck 44' in response to rough or uneven terrain encountered by the mower 40 to help the deck 44' float along the ground. By minimizing bouncing, the deck mounting bracket assembly 216 keeps the deck 44' stably positioned relative the ground 74 which helps ensure a consist even cut by preventing scalping when travelling over hills and other uneven terrain.

To control how far the deck 44' and each blade 45 of the deck 44' are suspended above the ground 74, preferably to control the depth of cut of grass being mowed, the deck 44' has a height adjustment assembly 240. The height adjustment assembly 240 preferably includes at least a plurality of spaced apart rollers 242 attached by a deck height adjustment bracket 248 to a rear wall 264 of the deck housing 210. Each roller 242 preferably is constructed of a durable and resilient elastomeric or synthetic material and is rotatively carried on an axle 244, preferably a common axle, such that the rollers 242 can be moved in unison up or down relative to the deck 44' by rotating a threaded height adjustment rod 246 attached to the axle 244 at one end and having a knob or handle 250 attached to its other end. Depending upon the width of the deck 44', the axle 244 can carry between about five and ten rollers. The adjustment rod 246 is rotatively fixed to a suspension plate 252 and has its opposite end threaded into the height adjustment bracket 248. The plate 252 has a pair of spaced apart, vertically extending, support shafts 254 fixed to or carried by the axle 244.

In operation, the height adjustment assembly 240 is constructed such that rotation of the handle 250 in one direction raises the deck 44' thereby increasing cutting height and rotation of the handle 250 in the opposite direction lowers the deck 44' decreasing cutting height. By rotating the handle 250, the rod 246 rotates raising or lowering the rollers 242 relative to the deck 44', depending upon rod rotation, which correspondingly lowers or raises the deck 44' and blades 45. In this exemplary manner, selective rotation of rod 246 results in selective and precise adjustment of cutting height for each deck 44 and 44' of the mower 40.

In another preferred deck height adjustment assembly embodiment, shown in phantom in FIG. 6, the height adjustment assembly 240' can be constructed without shafts 254 with the roller axle 244 carried by and pivotally mounted to the deck 44' by a generally tubular U-shaped carriage 256. The carriage preferably includes a generally straight tube, shaft or beam 258 behind the deck 44' fixed to axle 244 which threadably receives rod 246 and a pair of spaced apart arms 260 each of which pivotally mount to a sidewall 262 of the deck 44'. Rotation of the knob or handle 250 also controllably raises or lowers the deck 44' to set the cutting height.

FIGS. 6–10 illustrate the internal construction of deck 44 and 44'. The deck sidewalls 262 and rear wall 264 form a downwardly extending skirt about the periphery of the deck top wall 202. This skirt does not extend completely around the front of the top wall 202 resulting in a mower deck 44 and 44' of novel front discharge construction. Preferably, the front portion of the deck skirt has a front discharge port 296 through which cuttings are discharged. A downwardly angled deflector plate or flap 294 on the front of the deck 44' overlies a portion of the port 296 to help safely direct cuttings, rocks, sticks, and other debris downwardly toward the ground 74.

The interior of the deck 44' has a front baffle 266 and rear baffle 280 that extend from one side of the deck 44' to the other side of the deck 44' to define a cutting chamber 290 (FIG. 7) between the baffles 266, 280 and portions of deck sidewalls 262. At least a portion of the front baffle 266 is not flush with the interior surface of the deck top wall 202 to provide a discharge aperture 270 through which cuttings are forwardly discharged. The cutting chamber 290 defined is not as large as the cutting deck 44' to increase suction imparted on the cut material to help pull it quickly upwardly away from the path of the rotating cutting blades 45a, 45b, and 45c (FIGS. 7A and 7B) to minimize inertia-reducing drag on each blade. Preferably, the aperture 270 and port 296 are generally at least partially aligned such that a significant portion of the cuttings discharged from the aperture 270 efficiently pass substantially without obstruction through the port 296.

Inside the deck 44', the baffle 266 extends between sidewalls 262 and has at least a portion of its top edge 268 spaced from the top wall 202 of the deck 44' for directing cuttings between the baffle top edge 268 and the interior surface of the deck top wall 202 thus defining a forwardly facing discharge aperture 270 therebetween through which the cuttings are propelled. In a preferred embodiment, the top edge 268 of the front baffle 266 is disposed about two inches below the interior surface of the top wall 202 creating a forwardly facing discharge aperture 270 having dimensions, for example, of about two inches high and between about twenty-nine and no greater than thirty inches wide for a deck having a thirty inch cutting width.

The bottom edge 272 of the baffle 266 preferably extends about as low as the bottom edge 274 of the deck walls 262 and 264. Preferably, the bottom edge 272 also extends as low as the cutting edge 276 of each blade 45 and preferably can extend even a little below the cutting edge 276 to help stop or obstruct rocks, stones and other debris so they are not unsafely propelled by one of the blades 45 at high velocity out the front of the deck 44'. In the preferred deck embodiment shown in FIG. 6, the bottom edge 272 of the baffle 266 is flush with the bottom edge 274 of the deck 44'.

Preferably, the baffle 266 is curved around the blades 45, which are preferably staggered, and disposed adjacent and upstream of the blades 45 for enhancing and preferably maximizing upward suction created by rotation of each blade 45 to help better and more quickly propel the cuttings upwardly away from the ground 74 and blades 45 out the discharge aperture 270 to help ensure a better, cleaner cut while minimizing cutting blade drag ordinarily created by clippings. Preferably, the baffle 266 is located no more than about two inches from the outer peripheral edge 281 of each blade 45 or peripheral path defined by the blade during rotation to help maximize cutting-enhancing suction.

Disposed adjacent to and behind the blades 45 is a rear baffle 280 that extends from adjacent one sidewall 262 of the deck 44' to adjacent the other deck sidewall 262 for further increasing upward suction of the clippings during operation. As is more clearly shown in FIG. 7A, the rear baffle 280 has at least a portion adjacent its center that is spaced from the deck rear wall 264. In the preferred rear baffle embodiment shown in FIG. 7A, the baffle 280 extends from the rear wall 264 adjacent one sidewall 262 to the rear wall 264 adjacent the other sidewall 262. Preferably, a portion 282 of the baffle 280 is formed from the rear deck wall 264 adjacent each sidewall 262 or rearward corners of the deck 44'.

In the preferred rear baffle 280 shown in FIG. 7A, the baffle 280 is divided into three curved segments 284, 286 and 288 with each curved segment curved around a portion of a cutting blade 45, but spaced slightly from the blade 45. Each outer baffle segment 284 and 288 preferably is integral with the rear deck wall 264 adjacent each deck rear corner such that each outer baffle segment 284 is generally semi-circular and includes portion 282.

Portions of the outer baffle segments 284 and 288 and the center baffle segment 286 are spaced from the rear wall 264 of the deck 44'. If desired, the deck 44' can be constructed having a rear baffle 280 with a curved segment around each blade such that the baffle 280 extends from deck sidewall 282 to deck sidewall 282 such that the baffle 280 is completely separated and spaced from the deck rear wall 264.

Preferably, each baffle segment 284, 286 and 288 is spaced no farther than 0.250 inches from the outer periphery of the blade 45 it is adjacent for maximizing upward cutting suction. Preferably, each segment 284, 286 and 288 extends at least about $\delta=110°$ about the periphery of the rear of the center blade 45b it is disposed adjacent. For each of the outer blades 45a and 45c, each curved baffle segment 284 and 288 extends about $\delta=180°$ around the rear of the blade.

Preferably, a cutting deck 45 of this invention preferably has a segmented rear baffle 280 with an arcuately shaped baffle segment for each blade 45. For example, where a deck has two blades 45, the baffle 280 will have two curved baffle segments with each segment encircling at least a quarter of the periphery of the blade 45 it is adjacent. Where the deck has four cutting blades, the deck will have four such baffle segments.

In one preferred deck embodiment shown in FIGS. 6–9, the front wall 292 has a generally downwardly angled deflector flap 294 (shown in phantom in FIG. 1) which overlies a forwardly facing front discharge port 296 in the front wall 292 through which cuttings pass after being expelled from the cutting chamber 290 through aperture 270. In another preferred deck embodiment shown more clearly in FIGS. 1 and 10, the front wall 292' extends beyond each deck sidewall 262 and is generally arcuately shaped to deflect cuttings downwardly where, after being forwardly discharged through aperture 270, the remainder of the cuttings not directed into the ground 74 by the front wall 292' are discharged at each side through a discharge port 298 and 300 along each side of the front wall 292'.

Referring to FIGS. 6–9, the deflector flap 294 of the front deck wall 292 is slightly downwardly angled from the horizontal at an angle, $\alpha$, of at least about 5° and preferably between about 5° and 45°. If desired, the flap 294 can be multisegmented, such as is depicted in phantom in FIG. 8, or curved.

Preferably, the front discharge port 296 is framed on top by flap 294, at the sides by sidewalls 262 or portions of the front wall 292, and at the bottom by an integral lower guard 302 formed by the lower portion of the front wall 292. Preferably, the lower guard 302 helps stop rocks and other debris from being propelled at high velocity out the deck 44'.

The front wall 292 and deflector flap 294 preferably are of integral or unitary construction. If desired, the front wall 292 and flap 294 can be integral or unitary with the deck top wall 202 and sidewalls 262. If desired, the front wall 292, as well as the flap 294, can be removable or adjustable, if desired. For example, front wall 292 can be adjusted forwardly or rearwardly relative to the deck 44' and cutting blades 45 to selectively increase the force with which cuttings are directed into the ground 74 preferably to increase or decrease the amount of mulching that takes place. For example, if desired, front wall 292 can be removed and front wall 292' can be substituted for certain cutting applications, such as where it is desired to better mulch or more precisely manicure grass.

Figure 10:
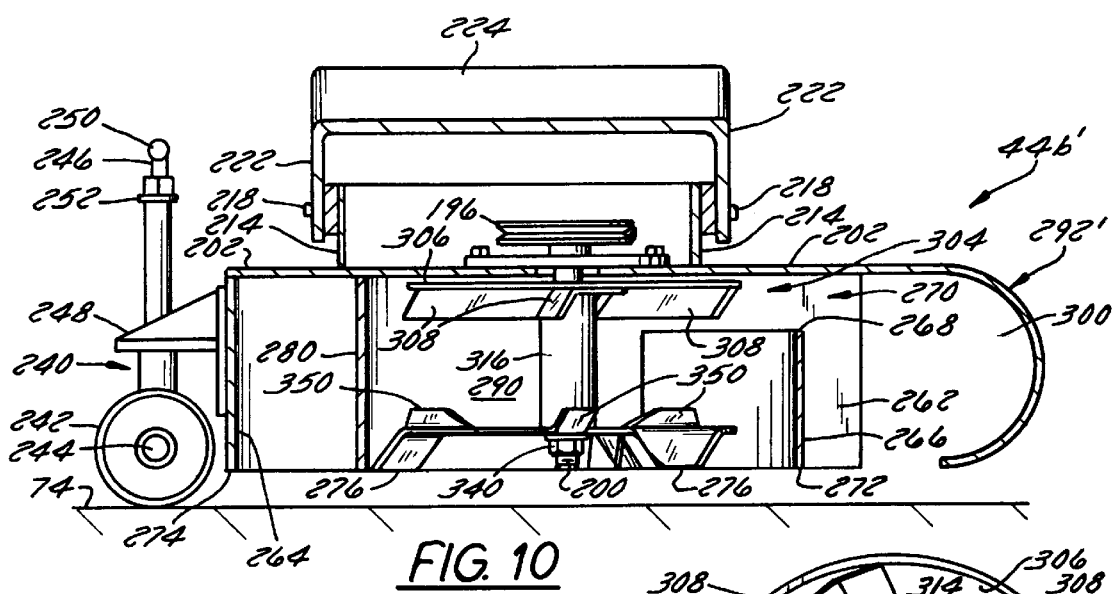
FIG. 10 is a side cross sectional view of a second preferred embodiment of the deck showing a shaft carrying the cutting blade adjacent the ground and a blower for assisting discharge of cut grass from the deck.

Referring to FIGS. 1 and 10, with the downwardly directing deflector surface of the front wall 292' spaced from the front edge of the deck top wall 202 and sidewalls 262, there is an unobstructed exhaust port 298 and 300 along each side of the front of the deck 44' for permitting air, as well as some cuttings, to be discharged outwardly completely free of the deck 44'. However, because the momentum of forwardly discharged cuttings is largely absorbed when it impacts the interior of the front wall 292', the velocity of the cuttings discharged out the ports 298 and 300 is lessened. Additionally, the exhaust ports 298 and 300 beneficially maximize the upward suction or draft created by each of the cutting blades 45 by helping to minimize back pressure within the deck 44'.

Figures 9, 11:
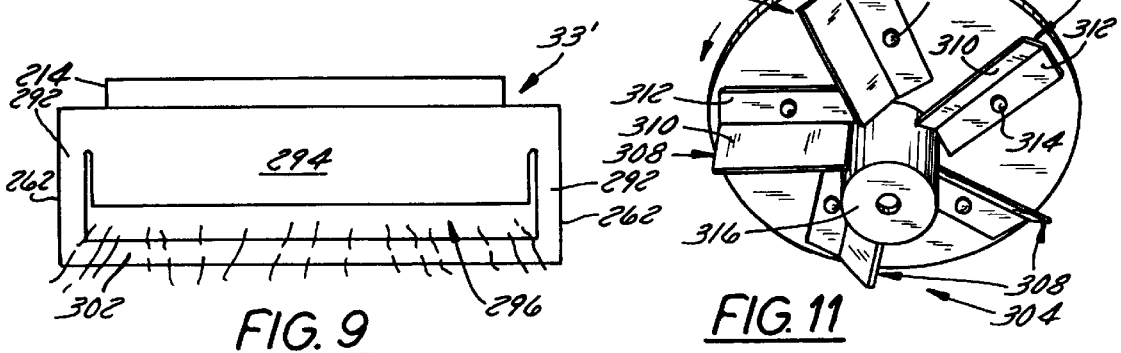
FIG. 9 is a front view of the deck.
FIG. 11 is a perspective view of the blower.

Referring to FIGS. 10 & 11, to help forwardly discharge cuttings out the deck 44b' while helping to prevent accumulation of clippings inside the deck 44b', one or more of the cutting blade drive shafts 200 can be equipped with a blower assembly 304 disposed adjacent the deck top wall 202 and spaced upwardly from the cutting blade 45. As is shown in more detail in FIG. 10, the blower assembly 304 comprises a generally circular disc 306 with a plurality of circumferentially spaced apart downwardly extending fins 308 which grab air within the deck 44b', help suspended clippings after they are cut, and help propel them forwardly out the discharge aperture 270.

Each fin 308 is generally L-shaped having one leg 310 that preferably extends axially outwardly from the disc 306 and which is inclined at an acute angle relative to the disc 306 and another leg 312 which is fixed to the disc 306 preferably by a rivet 314 or the like. Preferably, the fins extend radially outwardly generally from the collar and are equiangularly spaced apart from each other. Preferably, each fin has a length slightly less than the radially outward length from the exterior of the collar to the outer edge of the disc.

Preferably, as is shown by the direction indicating arrow in FIG. 10, the disc 306 is rotated in the same direction as the angle of inclination of each fin 308 during operation. Preferably, the disc 306, and thus the entire blower assembly 304, is rotated the same direction as the cutting blade 45 it overlies. By having the blower assembly 304 so close to the underside of the deck top wall 202, the constant air movement it creates during mowing presents a barrier to cuttings impacting against the underside of the deck 44b', minimizing the amount of clippings which stick to and accumulate there. By the fins 308 being inclined in the direction of rotation, the fins 308 help propel the clippings out the discharge aperture 270.

The blower assembly 304 has a generally cylindrical collar 316 with a bore in the collar 316 through which the cutting blade drive shaft 200 extends. A radially inwardly extending bolt (not shown) or another means of fastening preferably secures the collar 316 to the shaft 200 such that the blower 304 rotates in unison with both the shaft 200 and the blade 45 during mower operation.

As is shown in FIG. 7A, a deck 44 and 44' of this preferred construction preferably has at least two cutting blades 45 arranged in a staggered pattern such that the rotational axis of one blade 45 is in front of the rotational axis of another blade 45. Preferably, a deck of the preferred embodiment has three blades 45a, 45b and 45c with at least one of the blades 45b more forwardly located than the other of the blades 45a and 45c. While the deck 44' and 44 can be constructed with more than three cutting blades 45, at least one of the interiorly located blades is preferably farther forward than other blades outside the interiorly located blade. In the preferred deck embodiment, the center blade 45b is located farther forward than the blades 45a and 45c located on each side of the blade 45b. Preferably, the outer blades 45a and 45c are disposed such that their axes of rotation are located at about the same distance from the front and rear of the deck 44'.

Preferably the blades 45a, 45b, and 45c are staggered such that the swath of cut of each blade overlaps the swath of cut of its adjacent blade at least slightly so that the cut produced by the deck 44' extends evenly and continuously from the outside tip of one outer blade 45a to the outside tip of the other outer blade 45c, even while the mower 40 is turning. Preferably, the blades 45a, 45b, and 45c are staggered such that the shaft 200 of the center blade 45b is about one to two inches forward of the shaft 200 of the outer blades 45a and 45c enabling the cutting swaths of adjacent blades 45a and 45b and 45b and 45c to slightly overlap to ensure a continuous and even cut from side to side of the deck 44' without the blades 45a, 45b, and 45c contacting each other and without requiring any blade synchronizing gearing.

Preferably, each blade 45a, 45b and 45c is of disc-shaped construction for producing a cutting blade 45 each having high rotational inertia capable of cutting cleanly grass, weeds, sticks and even relatively small diameter trees while resisting significant variation in the rotational speed of the blade 45 during cutting. As a result of each cutting blade 45a, 45b and 45c of the deck 44' being of high inertia, disc-shaped construction, the horsepower required to rotate each blade at a suitably high rotational speed to ensure a high quality cut is reduced as compared to conventional rectangular cutting blades. As a result, a cutting deck 44 or 44' of this invention having disc-shaped cutting blades 45a, 45b, and 45c cuts more cleanly while using less engine power. As a further advantageous result of this novel deck and blade construction, mower fuel economy is improved while engine emissions are decreased.

FIG. 7B illustrates a second preferred embodiment of a mower deck 44" of this invention. Mower deck 44" is similar to deck 44' except that the outer blades 45 are forwardly staggered relative to the middle blade 45 preferably by at least about 2 inches and no more than about 3.5 inches. Additionally, baffle 266" disposed in front of all of the blades 45 is substantially straight instead of being curved. The baffle 266" is disposed between the blades 45 and the front discharge port 296 of the deck 44". The rear wall 264" of the deck 44" is curved about the periphery of all of the blades 45 in a manner similar that of the rear baffle 280 of deck 44' to maximize the suction created by the blades 45 during operation. Thus, the rear baffle 280 has been replaced functionally with a contoured rear deck wall 264". Rear deck wall 264" has a first rear corner 362 that is curved around the periphery of one forwardly staggered outer blade 45a and a second rear corner 364 that is curved around the periphery of the other forwardly staggered outer blade 45c, and a middle section 366 disposed adjacent to the rearwardly staggered middle blade 45b.

Push-Type Mower

Figure 12:
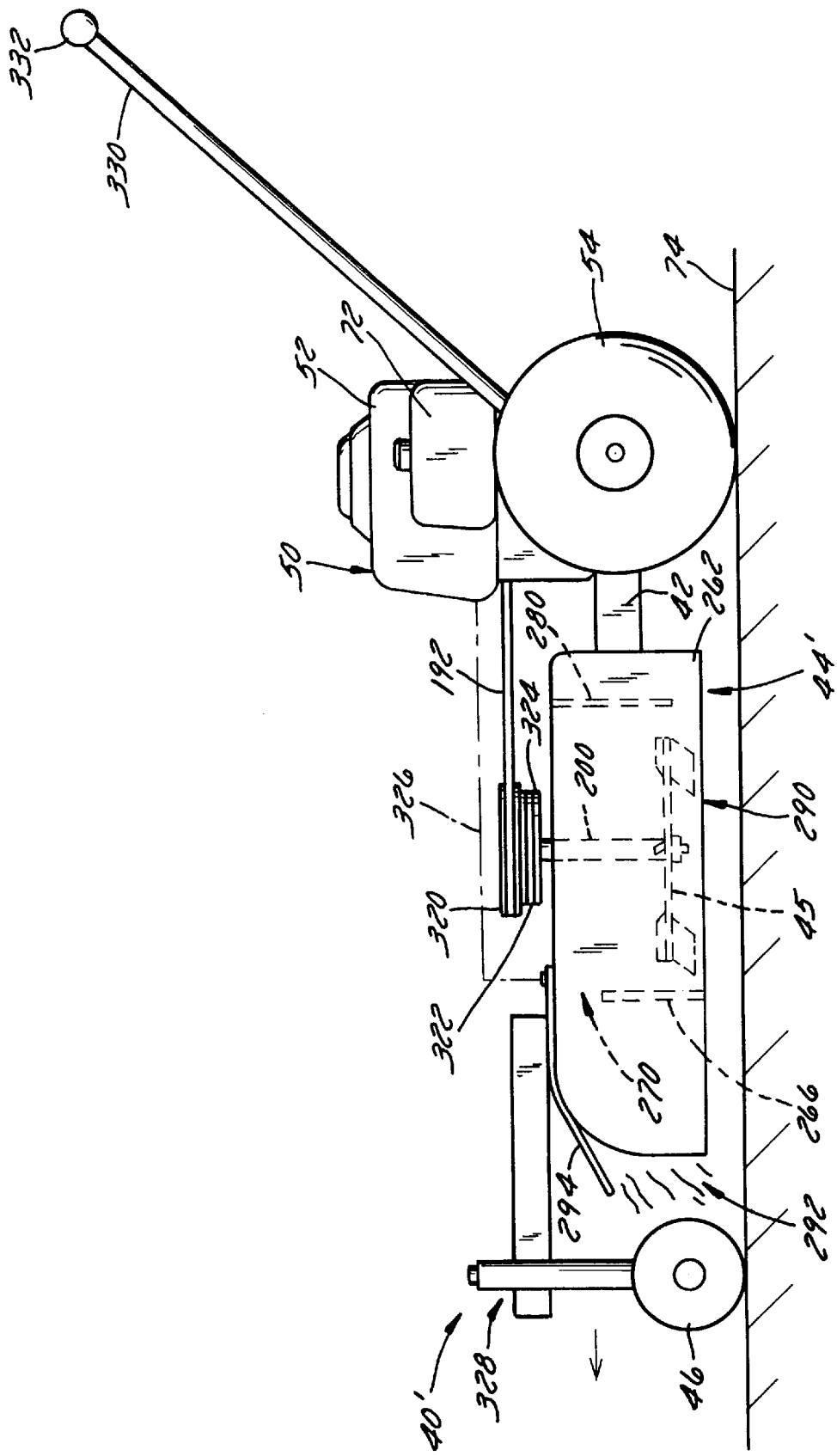
FIG. 12 is a view of a push-type mower equipped with the front discharge deck of FIGS. 6–10.

In another use of the front discharge deck of this invention, a push-type mower 40' is shown in FIG. 12.

Preferably, the front discharge deck has three spaced apart and staggered cutting blades 45. If desired, however, the mower 40' can have a pair of blades 45 or more than three cutting blades 45.

Preferably, each blade 45 is of disc-shaped construction. Preferably, each blade 45 is also of high inertia construction. Preferably, each disc-shaped blade 45 is substantially of the construction shown in FIGS. 13–18.

Such a push-type mower 40' can be self-propelled by a prime mover 50 or manually pushed by its operator (not shown). Although, the mower 40' has a fuel supply tank 72 and internal combustion engine 52, an electric motor powered by on-board batteries or an external electrical power source can be used to rotate the cutting blades 45. The same power source can also be used to propel the mower 40', if desired.

The engine 52 is coupled to each of the blades 45 preferably by a belt 192 that extends from a pulley 318 on the engine output shaft (not shown) to a pulley 320 carried preferably by the cutting blade shaft 200. At least one power transmission belt 322 communicates power from pulley 320 through a lower pulley 324 on the shaft 200 to a pulley (not shown) carried by each of the other blade shafts (not shown). A protective shroud 326 (shown in phantom in FIG. 12) preferably is attached to the deck and overlies and at least partially covers the pulleys 320 and 324 and belts 192 and 322.

To enable the mower 40' to move along the ground 74, the mower 40' preferably has four wheels with a pair of rear wheels 54 attached to a chassis 42 upon which the engine 52 is mounted. Each front wheel 46 preferably is mounted by a bracket 328 to the deck but can be mounted to the chassis 42 if desired. Each front wheel 42 preferably is pivotally attached to its mounting bracket 328 to permit easy maneuvering of the mower.

Extending upwardly at an angle away from the chassis 42 is a handle bar 330 with a handle 332 at its end. The handle 332 preferably is equipped with a deadman's switch constructed and arranged to stop each blade 45 from rotating should the operator release the handle 332.

While the push-type mower 40' shown in FIG. 12 is equipped with a single deck, additional decks can be ganged to the mower 40'. For example, the mower 40' can be constructed with a deck (not shown) on each side of deck shown in FIG. 12. Additional belts or shafts (not shown) can be used to transmit power to each blade of each ganged deck.

Disc-Shaped Cutting Blade

Referring additionally to FIGS. 13–18, each cutting blade 45 preferably is disc-shaped and has a plurality of radially outwardly extending cutting arms 334 that each extend radially outwardly from a central support spider 336 (circle in phantom in FIG. 14). The spider 336 preferably is substantially rigid and generally flat. In the preferred cutting blade embodiments shown in FIGS. 14–18, the spider 336 preferably is generally circular. Preferably, there is a mounting bore 338 generally centrally located in the spider 336 for enabling the blade 45 to be mounted to one of the cutting shafts 200 of a mowing deck by a bolt 340.

Figure 16B:
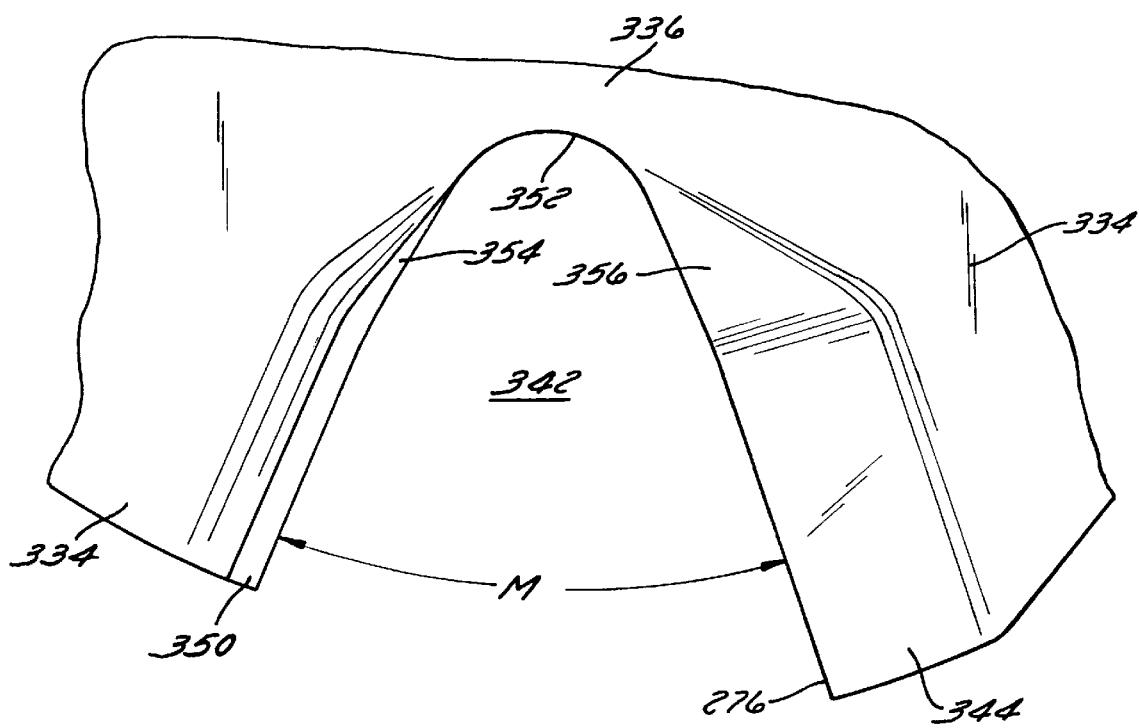
FIG. 16B is an enlarged fragmentary view of the blade.

Each cutting arm 334 is separated from an adjacent arm 334 by a radially inwardly extending cutting notch 342 that terminates at or adjacent the support spider 336. Preferably, the cutting notches 342 are generally equiangularly spaced apart circumferentially about the blade 45. To increase cutting efficiency during each rotation of each blade 45, each blade 45 preferably has at least three cutting arms 334 each separated by a cutting notch 342. Referring to FIG. 16B, the width of the mouth, M, of the cutting notch 342 at its widest point between adjacent cutting arms 334 preferably is at least about one and one-half inches wide and no greater than about four inches wide.

In the preferred blade embodiments shown in FIGS. 14–18, the blade 45 and 45' has exactly three cutting arms 334 and three cutting notches 342 with each notch 342 separating a pair of adjacent arms 334. As a result of having more than two such cutting arms 334, the blade 45 takes more frequent and smaller cuts for every blade rotation resulting in a better quality of cut for a given forward mower cutting speed. Additionally, as a result of the blade 45 taking smaller and more frequent cuts per blade rotation, drag on the blade 45 due to cutting of the grass is minimized thereby making it easier to maintain desired blade rotational speed using a minimum of engine horsepower. Thus, the disc-shaped cutting blade of this invention not only cuts with high quality and efficiency, but is energy efficient as well.

The leading edge of each cutting arm 334 at each notch 342 has a cutting edge 276 for engaging and cutting blades of grass and other organic material that contact the edge 276 during blade rotation. The cutting edge 276 preferably tapers substantially to a point such that it is sharp to help maximize cutting efficiency. Preferably, the cutting edge 276 is sharpened, such as by grinding or the like, such that it produces a knife-like edge 276. Preferably, each of the cutting edges 276 of a single blade 45 are substantially coplanar with each other and located below the plane of the spider 336 and cutting arms 334 of the blade 45.

To further maximize cutting efficiency, each arm 334 has a downwardly extending cutting tab 344 that carries the cutting edge 276. Each cutting tab 344 preferably extends radially outwardly substantially from adjacent the central support spider 336 to the outer periphery of its arm 334. Each tab 344 preferably is integral with its arm 334. Preferably, each arm and its cutting tab are of one-piece unitary construction. In the preferred embodiment, the arms 334, tabs 344, and central support spider 336 form a cutting blade 45 that is of one piece, unitary construction providing a blade that is rugged, durable, long lasting, can be quickly stamped lending itself well to mass production, and which is simple and economical to manufacture.

Each cutting tab 344 extends downwardly by a distance of at least about D=0.25 inch so that the cutting edge 276 is disposed at least 0.25 inch below the plane defined by the spider 336. By this downwardly extending tab construction, only the cutting edge 276 and a portion of its tab 344 comes into contact with cut grass and uncut grass, not the rest of the arm 334, thereby helping to minimize "grass drag" and rotational drag on the blade 45. By minimizing drag on the cutting blade, an engine or electric motor of smaller horsepower can be used to maintain the blade at a desired rotational speed, as compared to a conventional blade which suffers significantly from grass drag. For example, the disc-shaped blade 45 shown in FIGS. 14–16 requires an engine or motor having a horsepower about 20% less than for a rectangular blade of same diameter.

Preferably, each cutting tab 344 is at least about L=0.50 inch long from the downward bend 346 to the cutting edge 276. Preferably, the tab 344 is at least about $W_1$=1.25 inches wide.

Preferably, the downward angle, a, of each cutting tab 344 is selected to help the cuttings to be lifted free of the grass below the blade 45 and functions as an up-ramp that quickly slides between the cuttings and the grass below the blade 45.

As is shown in FIGS. 15, each cutting tab 344 is downwardly angled at an angle, α, of between about 125° and about 145° and is preferably about 135°. This downwardly angled tab construction also creates upward cutting suction while minimizing aerodynamic drag on the blade 45 further minimizing drag losses thereby increasing the efficiency of the blade 45.

This downwardly angled cutting tab construction also creates airflow in the vicinity of the cutting edge 276 that stands the grass straight up as the edge 276 contacts the grass shearing the grass generally perpendicularly to each upstanding blade of grass. The airflow maintains the grass in this straight-up position during the cut. This advantageously results in a cleaner, straighter cut that consumes less energy as compared to a rectangular blade which bends the grass over about 90° before cutting the grass which results in an uneven cut. By shearing the grass more cleanly, browning of the cut grass at its tips is prevented resulting in cut grass that stays greener longer, even in dry conditions.

To help lift cuttings upwardly away from the blade 45 so it can be propelled out the deck or forwardly through the discharge port 296 of the deck, the trailing edge 348 of each cutting arm 334 has an upwardly angled suction-inducing flap 350. Preferably, the flap 350 extends upwardly from its cutting arm 334 by at least about H=0.125 inches, is at least about S=0.25 inches long, and is at least about $W_2$=1 inch wide. As is shown in FIGS. 14 and 15, the flap 350 extends radially outwardly from adjacent the outer periphery of the spider 336, shown in phantom in FIG. 14, to the outer periphery of the blade 45. Preferably, the flap 350 is generally angled upwardly at an angle of : of at least about 150° and no greater than about 170° to provide a desired amount of suction to quickly propel cuttings upwardly and out of the path of the rest of the blade 45.

Preferably, each flap 350 is generally angled upwardly at an angle of β of between about 155° and about 165°. Preferably, each suction inducing flap 350 is integral with its arm 334. In the preferred cutting blade embodiment shown in FIGS. 14 and 15, the flaps 350, arms 334, cutting tabs 344, and spider 336 form a disc-shaped blade 45 of one-piece unitary construction. Preferably, the blade 45 is at least about 0.0625 inches thick. Preferably, the blade 45 has a thickness of between about ten gauge and about fourteen gauge.

To further help maintain blade rotational speed, the blade 45 preferably is of a weight such that its mass provides a large amount of rotational inertia such that even the blade 45 encountering thick grass, small trees, weeds and the like does not significantly slow down the blade 45. Additionally, by the blade 45 having a large enough weight such that the blade 45 has a large amount of rotational inertia, the disc-shaped cutting blade 45 of this invention helps minimize any reduction in blade rotational speed when the blade 45 encounters an object such as a tree, thick grass, moist grass, foliage, rocks, upraised mounds of earth and the like thereby also helping to consistently maintain a high quality and clean cut under an incredibly wide variety of adverse cutting conditions.

For a blade 45 of this invention constructed of a metal, preferably steel, having a diameter of about nine inches, preferably about nine and one-half inches, the blade 45 weighs at least about one pound and eight ounces to provide a desirably high magnitude of rotational inertia during operation. This minimum blade weight is critical to ensure a desirably high magnitude of rotational inertia when rotated during operation. Preferably, a nine and one-half inch diameter steel blade 45 weighs between about one pound and thirteen ounces and two pounds and ten ounces to impart to the blade 45 a desired amount of mass to maintain such a desirably high rotational inertia during operation. Additionally, to achieve the desirably high rotational inertia, the blade 45 preferably is rotated at a speed such that the radially outer peripheral tip of the cutting edge 276 achieves a blade tip speed of at least about fourteen thousand feet per minute and no greater than nineteen thousand feet per minute. Preferably, the blade 45 is rotated at a speed of at least about 4,000 revolutions per minute and no greater than about 5,500 revolutions per minute to achieve a desirably high amount of rotational inertia. For a blade 45 of this invention constructed of metal, preferably steel, having a diameter of about ten inches, the blade 45 weighs at least about two pounds and no greater than about three pounds and eight ounces to ensure a desirably high magnitude of rotational inertia during operation.

For a metal blade 45 of this invention, preferably constructed of steel and having a diameter of about twelve inches, the blade 45 weighs at least about two and one-half pounds and no greater than about four and one-half pounds to ensure that the blade 45 has sufficient mass to maintain a desirably high magnitude of rotational inertia when rotating at a preferred rotational speed of between about 3,800 revolutions per minute and about 4,200 revolutions per minute. In this manner, a pair of blades 45 can be used with the mower decks of this invention to achieve a cutting width of between at least about twenty inches and about twenty four inches. If desired, three cutting blades 45 each having a twelve inch diameter can be used with a single mower deck of this invention to achieve a cutting width of between at least thirty inches and about thirty six inches.

For a metal blade 45 of this invention having a diameter of fifteen inches, the blade 45 weighs at least about three pounds and no greater than about six pounds to ensure that the blade 45 has sufficient mass to maintain a high magnitude of rotational inertia when rotating at a preferred rotational speed of between about 3,300 revolutions per minute and about 3,600 revolutions per minute (i.e. rotational speed achieving no greater than about 19,000 feet per minute). In this manner, a pair of blades 45 of this diameter can be used with the mower decks of this invention to achieve a cutting width of between at least about twenty five inches and about thirty inches. If desired, three cutting blades 45 each having a fifteen inch diameter can be used with a single mower deck of this invention to achieve a cutting width of between at least thirty five and about forty five inches.

No matter what the size of the blade 45, the blade 45 of this invention is constructed with a weight-to-diameter ratio of at least about 2.0 ounces per inch. Preferably, each blade 45 of this invention is constructed with a weight-to-diameter ratio of between about 2.4 ounces per inch and no greater than about 4.5 ounces per inch. For example, for a ten inch disc-shaped blade made from ten gauge steel, the blade 45 has a weight-to-diameter ratio of about 2.4 ounces per inch.

Preferably, no blade 45 of this invention is rotated at a speed greater than 6,500 revolutions per minute where the smallest blade diameter is no smaller than nine inches. For smaller blade diameters, the maximum rotational speed preferably is no greater than about 15,000 revolutions per minute. Examples of where such blades speeds might be acceptable is where the blade 45 is used on lawncare equipment other than mowers, such as for example, weed cutters, weed whips, and the like.

Preferably, the rotational inertia of the blade 45 advantageously minimizes reductions in blade rotational speed when the blade 45 encounters obstacles during cutting.

The disc-shaped cutting blade 45 preferably is substantially symmetrical. The blade 45 preferably vibrates less compared to a rectangular blade during operation leading to smoother operation. Additionally, the disc-shaped blade 45 preferably wears slower, is more durable and cuts with high quality for a longer time. A First Preferred Blade Embodiment One preferred disc-shaped cutting blade embodiment 45 is shown in FIGS. 14–16B. The blade 45 has three cutting arms 334 each with a downwardly extending cutting tab 344 and an upwardly extending suction-inducing flap 350. Each cutting tab 344 is constructed and arranged such that its cutting edge 276 is substantially straight and extends radially outwardly generally perpendicular to a tangent to the periphery of the blade 45 at the cutting edge 276. The cutting edge 276 extends radially inwardly to an upwardly angled portion 356 of the tab 344 that can be sharpened but preferably is not sharpened. The upwardly angled portion 356 provides a transition surface between the spider 336 and cutting edge 276 that is relatively smooth and which is designed to prevent the accumulation of clippings on the blade 45.

Referring to FIG. 16B, the cutting notch 342 has a rounded portion 352 extending from the upwardly angled transition 356 to a downwardly angled transition portion 354 of the suction-inducing flap 350. Preferably, the cutting tab 344 extends downwardly from the plane defined by the spider 336 farther than the distance the flap 350 extends upwardly from the spider 336. Each flap 350 preferably also extends straight and radially outwardly from the spider 336.

The cutting notch 342 is widest at its mouth, M, between the tab 350 and its clockwise adjacent flap 350 and narrows as it extends radially inwardly toward the center of the blade 45 as both the tab 344 and flap 350 converge adjacent the spider 336. Preferably, there is at least one inch space between each tab 344 and its adjacent opposed flap 350 at the mouth, M, such that the cutting notch 342 provides a clearance channel to draw air up from below the blade 45 during blade rotation to help propel cuttings upwardly away from the ground 74, the grass rooted in the ground 74, and the blade 45. Additionally, this construction and spacing helps the suction created by the flap 350 to become at least slightly turbulent as it reaches the trailing adjacent cutting tab 344 for helping to turbulently propel cut grass upwardly away from the tab 344 at high velocity drawing the grass away from the ground 74 and blade 45 while also helping to minimize and preferably substantially prevent grass accumulation on the blade 45.

To maximize cutting efficiency while minimizing drag on the blade 45 created by uncut grass, the flap 350 in front of the immediately trailing cutting tab 344 that is in contact the grass cutting the grass is slightly radially inwardly offset, δ, relative to at least the trailing cutting edge 276. By this offset, δ, uncut grass is always first encountered by a cutting edge 276 as the blade 45 rotates and not any other portion of the blade 45 thereby maximizing cutting efficiency. As is shown in FIG. 14, for each arm 334, the periphery of the blade 45 tapers slightly radially inwardly following its cutting tab 344 which thereby creates the offset, δ, between the tab 344 and flap 350 of the same arm 334. Preferably, the offset, δ, for each cutting arm 334 is at least about δ=0.1 inches.

Referring to FIG. 13, in the construction of the blade 45, a round blank 358 of metal is stamped, forged, or cut, such as by laser cutting or the like, to produce the notches 342 separating each cutting arm 334. After stamping, forging, or cutting, each cutting tab 344 and flap 350 of each arm 334 is bent to the desired angle producing a disc-shaped cutting blade of the shape shown in FIGS. 14–16B. Thereafter, the edge of each cutting tab 344 is machined or ground to produce a sharp grass cutting edge 276. If desired, the blade 45 can be constructed such that the cutting edge 276 of each arm 334 is formed upon cutting, stamping or forging the blank 358.

Preferably, in making the blade 45, the blank 358 is engaged by a blanking die (not shown) which produces a cut blank substantially of the plan profile shown in FIG. 14 having spaced apart cutting arms 334. A forming die and press (not shown) preferably is used to form each tab 344 and flap 350. Thereafter, a milling machine preferably is used to mill each cutting edge 276 of each tab 344. To enable the blade 45 to be mounted to the deck shaft 200, at least one centrally located mounting hole 338 is drilled or die punched through the spider portion 336 of the blade 45.

The material of the blank 358 preferably is 1010, 1030 or 1040 steel. Each cutting tab 344 and cutting edge 276 can be hardened, preferably after forming has taken place, to make the edge 276 more wear resistant to increase its cutting life. For example, mild steel can be carburized and then hardened. Other types of metals can be used. For example, steel alloys can be used. Materials such as chrome vanadium, stainless steel, titanium, and the like, can be used as the blade 45 and edge 276 material.

Example

An example of a cutting blade 45 depicted in FIGS. 14–16B is disclosed below. The blade 45 is constructed of a one-eighth inch circular blank 358 of 1040 steel that is nine and one-half inch diameter. The blank 358 is stamped and formed to form the three dimensionally contoured blade 45 shown in FIGS. 14 and 15 weighing about one pound and fourteen ounces and having a weight-to-diameter ratio of 3.16 ounces per inch. The mouth, M, of each notch 342 is about four and one-half inches wide. Each notch 342 extends radially outwardly about four inches and is generally triangularly shaped. The circumferential width of each cutting arm 348 from tab 344 to flap 350 at its widest point is about six inches. The cutting edge 276 of each tab 344 is about two inches wide. Each tab 344 is about one inch long and is bent downwardly at an angle of about 135°. Each flap 350 is about one-half inch long, one and one-half inch wide and bent at an angle of about 155°. The offset, δ, between the radially outermost portion of the cutting edge 276 and radially outermost portion of the flap 350 is about one-half inch.

Second Preferred Blade Embodiment

A second preferred disc-shaped cutting blade 45' embodiment is shown in FIGS. 17 and 18. Each cutting notch 342 is a polygon shape having a slot 360 that extends circumferentially into the adjacent cutting arm 334 adjacent the cutting edge 276 for preventing buildup of cuttings on the blade 45'. The slot 360 also extends circumferentially in the other direction defining where each suction-inducing flap 350 separates from its cutting arm 334. Each flap 350 preferably is generally rectangularly shaped and unitary with its cutting arm 334, but can be a separate piece of metal welded to the cutting arm 334 at the desired angle. Each tab 344 preferably is unitary with its cutting arm 334, is generally rectangularly shaped, and has a cutting edge 276 generally parallel to the plane defined by the spider 336 and the cutting arms 334.

Example

An example of a cutting blade 45' depicted in FIGS. 17 and 18 is disclosed below. The blade 45 is constructed of a one-eighth inch circular blank 358 of 1040 steel that is ten inches in diameter. The blank 358 is stamped and formed to form the substantially flat and three dimensionally contoured blade 45' shown in FIGS. 17 and 18 weighing about two pounds and seven ounces and having a weight-to-diameter ratio of about 3.9 ounces per inch. The mouth of each notch 342 is about two and one-half inches wide. Each notch 342 extends radially outwardly about two and one-quarter inches and is generally polygonal shaped. The width of each cutting arm 334 at its widest point is about seven inches. The cutting edge 276 of each tab 344 is about one and eleven-sixteenths inches wide and extends below the bottom surface of the spider 336 of the blade 45' about five-eighths of an inch. Each tab 344 is about one and three-eighths inch long and is bent downwardly at an angle α of about 135°. Each flap 344 is about one half inch long, two inches wide and bent at an angle of about 135°. There is no offset between the radially outermost portion of the cutting edge 276 and radially outermost portion of the suction-inducing flap 350.

Use and Operation

The mower 40 of this invention has the combination of a forward discharge cutting deck and disc-shaped cutting blade 45 for producing a mower 40 that cuts grass cleanly, producing a high quality cut, while minimizing engine horsepower required to rotate each disc-shaped blade 45 at the desired rotational speed. Because the mower 40 of this invention uses a disc-shaped cutting blade 45 having sufficient mass to impart high rotational inertia, the quality of cut is maintained even under operating conditions which would tend to slow the blade 45 down or otherwise interfere with its cutting ability. Such a mower 40 can be a push mower 40 like that shown in FIG. 12 or a riding-type mower 40 like that shown in FIG. 1 having a single cutting deck or multiple decks. Preferably, each deck of the construction designated by reference numerals 44, 44a', 44b' and 44" has at least two disc-shaped cutting blades 45 that can be independently driven but are preferably driven in unison by a common source of power. Each disc-shaped blade 45 is generally circular, has at least two cutting arms 334 and preferably has at least three cutting arms 334.

In use, the mower 40, deck 44, 44a', 44b' or 44" and blade 45 or 45' form a novel cutting combination that is particularly well suited for high quality cutting and fine manicuring applications, such as the cutting of baseball parks, golf courses, parks, cemeteries and the like. However, the mower 40, deck 44, 44a', 44b' or 44" and blade 45 or 45' of this invention are also well suited for general cutting applications including cutting applications where weeds, moist grass, and even very small diameter trees are involved.

As a result of each cutting blade 45 or 45' having a suction-inducing upwardly extending flap 350 circumferentially spaced from and trailing each downwardly extending cutting edge 276, each cut is more clean because the suction created by the blade 45 or 45' helps pull the top of each grass blade being cut upwardly away from its stem rooted in the ground 74. As a result of the front discharge construction of the deck 44, 44a', 44b' or 44", cut grass is propelled by blade suction and directed forwardly. Preferably, the suction created by the blade 45 or 45' moves air and clippings within the deck 44, 44a', 44b' or 44" at high velocity until the cuttings are deflected into the ground in front of the blades 45 or 45' of the deck 44, 44a', 44b' or 44" helping to impel the clippings between the blades of uncut grass about to be cut such that at least some of the cut clippings lie in contact with earth 74 or dirt below the grass line. These cuttings are thereafter preferably drawn back into the deck 44, 44a', 44b' or 44" and recut resulting in a mower 40 that not only cuts with high quality but also mulches the cuttings as well.

As a result of using a disc-shaped cutting blade 45 having three spaced apart cutting arms, each rotation of the blade 45 produces one-third more cuts per foot of forward distance traveled by the mower 40 than a rectangular cutting blade of a length the same as the diameter of the blade 45 rotating at the same speed. However, for cutting decks greater than about twenty inches in width, the use of three disc-shaped cutting blades 45, as opposed to the two rectangular blades typically used, results in the blades 45 being rotated faster which further increases the number of cuts made by each blade 45 per foot of forward distance traveled by the mower 40.

In operation of the riding mower 40, the engine 52 turns the rear wheels 54 while simultaneously delivering power to each blade 45 of each deck of the mower. Preferably, the engine 52 supplies sufficient power to propel the mower 40 forward at a maximum speed of at least about five miles per hour. Preferably, the engine 52 turns each blade 45 of each deck of the mower such that each blade 45 has a cutting tip speed or cutting edge speed of at least about 12,500 feet per minute and no greater than about 19,000 feet per minute such that at maximum mower speed each cutting edge 276 of a blade 45 having three cutting arms 334 cuts between about 0.032 and about 0.023 inches per blade revolution.

As the riding mower 40 encounters hills and uneven terrain during operation, its rear wheel drive construction advantageously maximizes traction while helping to increase maneuverability enabling the mower 40 to cut in tight and irregular spaces. The novel independent front suspension 48 also advantageously helps to navigate over hills and rough and uneven terrain by behaving as a fixed solid axle under certain situations, providing great strength and stability, and as an independently pivotable independent suspension in other situations, helping to ensure a uniform cut while traveling over uneven terrain. Additionally, the pivot mounting of the mower deck to the mower frame 42 combined with the use of relatively small diameter, preferably less than 15 inch diameter, cutting blades 45, help enable the riding mower 40 to more evenly and uniformly cut uneven terrain while minimizing and preferably substantially preventing scalping.

In operation of the push-type mower 40', the engine 52 is coupled to all of the blades 45 of each of its mower decks to substantially simultaneously turn all of the blades 45 in unison. If desired, the engine 52 can be coupled to one or both rear wheels 54 to help self-propel the mower 40' forwardly.

In operation of the cutting deck 44, 44a', 44b' or 44" and blade 45, the front discharge construction causes the grass to be discharged into the path of travel of the deck so at least some previously discharged cut grass clippings are pulled upwardly from the ground and recut into finer clippings which ultimately are more easily directed below the uncut grass stems below the top surface of the grass. By cutting the grass clippings into increasingly finer pieces, decomposition is accelerated while minimizing and preferably preventing grass clippings from accumulating on top of the ground. By generating a considerable amount of suction creating a higher velocity discharge stream from the deck 44, 44a', 44b' or 44", cut grass clippings are more likely to end up below the grass line on the dirt or earth below the grass line also increasing decomposition efficiency.

Therefore, as the mower 40 is urged forwardly along the ground 74 with or without engine assistance, each blade 45 rotates cutting grass preferably with each blade rotation. Cut grass is lifted upwardly within the deck 44, 44a', 44b' or 44" and forwardly discharged and directed downwardly into the ground 74. Blower 304 can be carried by one of the shafts 200 to increase suction and help propel forwardly cut clippings out the front of the deck 44, 44a', 44b' or 44" at a higher velocity. At least some forwardly discharged cut clippings are drawn upwardly back into the path of at least one of the rotating blades 45 where they preferably are recut into smaller sized clippings.

It is also to be understood that, although the foregoing description and drawings describe and illustrate in detail working embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

What is claimed is:

1. A mower comprising:
   a) a frame;
   b) a plurality of wheels carried by the frame with at least one of the wheels disposed adjacent a front end of the mower and in contact with the ground and at least one of the wheels disposed adjacent a rear end of the mower and in contact with the ground;
   c) a cutting deck carried by the frame;
   d) a cutting blade housed within the deck, the cutting blade having a diameter and a generally disc-shaped body that is disposed generally in a plane when it is rotated, the disc-shaped body comprising an upper surface, a lower surface disposed toward the ground, and at least three circumferentially spaced apart cutting arms that extend radially outwardly from the disc-shaped body, each of the cutting arms comprising a leading edge with a cutting tab that extends downwardly at an angle relative to the plane and that is defined by a radial bend line and a trailing edge with a flap that extends upwardly at an angle relative to the plane, and each cutting tab comprising a cutting edge disposed along an edge of the cutting tab disposed adjacent the ground, wherein the cutting blade has a weight of at least one pound and eight ounces and has a weight-to-diameter ratio of between about 2.0 ounces per inch of diameter and about 4.5 ounces per inch of diameter, and wherein, during operation, the cutting blade is turned at a rotational speed of at least about 3,500 revolutions per minute and no greater than about 5,000 revolutions per minute such that the velocity of the radial periphery of the cutting blade is at least about 14,000 feet per minute and no greater than about 19,000 feet per minute; and
   e) a prime mover carried by the frame and operably coupled to the blade for rotating the blade.

2. The mower of claim 1 wherein the deck comprises a top wall, a sidewall extending downwardly from the top wall, a discharge, and a baffle inside the deck disposed between the discharge and the cutting blade that is spaced from an interior surface of the top wall, defining a disharge aperture through which cuttings are discharged.

3. The mower of claim 2 wherein the baffle, top wall and sidewall define a cutting chamber within which the cutting blade is disposed.

4. The mower of claim 3 wherein the deck comprises a rear wall and a pair of spaced apart sidewalls and the baffle extends from one of the sidewalls to the other of the sidewalls.

5. The mower of claim 4 wherein the baffle is generally straight.

6. The mower of claim 4 wherein the baffle is not straight.

7. The mower of claim 6 wherein the baffle is curved.

8. The mower of claim 2 wherein the deck comprises a plurality of cutting blades with one of the cutting blades staggered forwardly relative to the other of the cutting blades.

9. The mower of claim 2 wherein the discharge of the cutting deck is a front-facing discharge.

10. The mower of claim 1 wherein the deck comprises three spaced apart cutting blades with one of the cutting blades disposed between the other two of the cutting blades, and with the other two of the cutting blades staggered relative to the one of the cutting blades.

11. The mower of claim 1 wherein the disc-shaped body and cutting arms are disposed in the same plane.

12. The mower of claim 1 wherein all of the cutting edges of the cutting blade are disposed generally in a common plane.

13. The mower of claim 1 wherein the disc-shaped body, the cutting arms, the cutting tabs of each of the cutting arms, and the flaps of each of the cutting arms form a cutting blade of one-piece, unitary construction.

14. The mower of claim 1 wherein the disc-shaped body is planar, and wherein each of the cutting tabs extends downwardly at an angle, $\alpha$, of between about 125° and about 145° relative to the plane of the disc-shaped body.

15. The mower of claim 1 wherein the disc-shaped body is planar and each of the cutting tabs 1) extends a distance, D, of at least about 0.25 inches downwardly from the cutting arm to which the cutting tab is mounted, 2) has a length, L, of at least about 0.50 inches, and 3) has a width, $W_1$, of at least about 1.25 inches.

16. The mower of claim 1 wherein the disc-shaped body is planar and each of the flaps is upwardly angled between about 150° and about 170° relative to the plane of the disc-shaped body.

17. The mower of claim 1 wherein the disc-shaped body is planar and each of the flaps 1) extends upwardly relative to the plane of the of the disc-shaped body a distance, H, of at least about 0.125 inches, 2) has a length, S, of at least about 0.25 inches, and 3) has a width, $W_2$, of at least about 1 inch.

18. The mower of claim 1 wherein each adjacent pair of the cutting arms is separated by a generally triangular notch.

19. The mower of claim 18 wherein the disc-shaped cutting blade comprises at least three of the notches and all of the notches are generally equiangularly circumferentially spaced apart.

20. The mower of claim 18 wherein each of the notches has a mouth having a width at a widest point of the cutting notch that is at least about 1.5 inches and that is no greater than about 4 inches wide with each of the cutting notches providing clearance so that cuttings can be sucked upwardly through the notches when the disc-shaped cutting blade is rotated.

21. The mower of claim 1 wherein the disc-shaped cutting blade has a diameter of at least about nine inches and a weight of at least about one pound and eight ounces to impart to the disc-shaped cutting blade a desired magnitude of rotational inertia for cutting when the disc-shaped cutting blade is rotated at a rotational speed of at least about 3,000 revolutions per minute and no greater than about 5,000 revolutions per minute such that the speed of the disc-shaped cutting blade at its outer radial periphery is no greater than about 19,000 feet per minute.

22. The mower of claim 21 wherein the disc-shaped cutting blade has a diameter of about ten inches and a weight of at least about two pounds.

23. The mower of claim 1 wherein the disc-shaped cutting blade has a diameter of about nine inches and a weight of at least about one pound and eight ounces to impart to the disc-shaped cutting blade a desired magnitude of rotational inertia for cutting when the disc-shaped cutting blade is rotated at a rotational speed of between 1) about 4,000 revolutions per minute and 2) about 5,000 revolutions per minute such that the speed of the disc-shaped cutting blade at its outer radial periphery is at least about 14,000 feet per minute and no greater than about 19,000 feet per minute.

24. The mower of claim 23 wherein the disc-shaped cutting blade has a diameter of about nine and one-half inches.

25. The mower of claim 1 wherein the disc-shaped cutting blade has a diameter of about twelve inches and a weight of at least about two pounds and eight ounces to impart to the disc-shaped cutting blade a desired magnitude of rotational inertia for cutting when the disc-shaped cutting blade is rotated at a rotational speed of between 1) about 3,800 revolutions per minute and 2) about 4,200 revolutions per minute such that the speed of the disc-shaped cutting blade at its outer radial periphery is no greater than about 19,000 feet per minute.

26. The mower of claim 1 wherein the disc-shaped cutting blade has a diameter of about fifteen inches and a weight of at least about three pounds to impart to the disc-shaped cutting blade a desired magnitude of rotational inertia for cutting when the disc-shaped cutting blade is rotated at a rotational speed of between 1) about 3,300 revolutions per minute and 2) about 3,600 revolutions per minute such that the speed of the disc-shaped cutting blade at its outer radial periphery is no greater than about 19,000 feet per minute.

27. The mower of claim 1
 a) further comprising a pair of spaced apart wheels disposed adjacent the front of the mower or adjacent the rear of the mower;
 b) further comprising an independent suspension coupling the pair of spaced apart wheels to the frame; and
 c) wherein the independent suspension comprises 1) a pair of spaced apart control arms each having i) one end carrying one of the front wheels and ii) another end pivotally connected to the frame, and 2) a pair of biasing elements i) in operable communication with both of the control arms ii) that each urge the control arms apart from each other, and 3) arranged in a criss-cross pattern.

28. The mower of claim 27 wherein each of the biasing elements comprises a coil spring disposed between the control arms.

29. The mower of claim 28 wherein each of the control arms further comprises a generally upwardly extending lever arm adjacent the end of the control arm that is pivotally connected to the frame and wherein each of the biasing elements are connected to the lever arm of both of the control arms.

30. The mower of claim 1
 a) further comprising a pair of spaced apart rear wheels carried by the frame;
 b) wherein the prime mover comprises an internal combustion engine coupled to the rear wheels;
 c) further comprising a pair of spaced apart wheels adjacent the front of the mower which are coupled to the frame by an independent front suspension;
 d) wherein the independent front suspension comprises 1) a pair of spaced apart control arms each i) having one end receiving one of the front wheels and ii) having another end pivotally connected to the frame, and 2) at least one biasing element i) in operable communication with both of the control arms and ii) urging the control arms away from each other helping to keep the front wheels in contact with the ground and
 e) wherein each biasing element is captured in compression between both of the control arms and is disposed over the frame of the mower.

31. The mower of claim 30 wherein the biasing element comprises 1) a coil spring; 2) a sleeve i) connected at one end to one of the control arms, ii) telescopically received in the coil spring and iii) having a hollow therein; and 3) a rod i) connected at one end to the other of the control arms, ii) telescopically received in the coil spring and iii) slidably telescopically received in the hollow in the sleeve.

32. A mower comprising:
 a) a frame;
 b) a plurality of wheels carried by the frame with a pair of the wheels disposed adjacent a front end of the mower and a pair of the wheels disposed adjacent a rear end of the mower;
 c) an independent suspension coupling a pair of the wheels to the frame;
 d) a cutting deck carried by the frame and having a at least one cutting blade housed within the cutting deck;
 e) a prime mover carried by the frame that is operably coupled to the cutting blade for rotating the cutting blade and that is operably coupled to a pair of the wheels for rotating the wheels, and
 f) wherein the independent suspension comprises 1) a pair of spaced apart control arms, each of the control arms having i) one end carrying one of the front wheels, ii) another end operably connected to the frame, and iii) a mount, and 2) a pair of biasing elements operably connected to the control arm mounts and arranged such that the pair of biasing elements crisscross one another.

33. The mower of claim 32 wherein the deck has a discharge and a top wall and further comprises a baffle inside the cutting deck disposed between the cutting blades and the discharge wherein the baffle is spaced from the top wall defining a discharge aperture disposed between the disc-shaped cutting blades and the discharge.

34. The mower of claim 33 wherein the discharge of the cutting deck faces forwardly.

35. The mower of claim 32 wherein each biasing element is located above the frames is captured in compression by the control arms, and urges the control arms apart from each other, thereby helping to keep the front wheels in contact with the ground.

36. The mower of claim 35 wherein each mount comprises a mounting arm, and wherein both of the biasing elements are captured in compression between the mounting arms of the control arms.

37. The mower of claim 31 wherein each biasing element comprises 1) a coil spring; 2) a sleeve i) connected at one end to one of the control arms, ii) telescopically received in the coil spring and iii) having a hollow therein; and 3) a rod i) connected at one end to the other of the control arms, ii)

telescopically received in the coil spring and iii) slidably telescopically received in the hollow in the sleeve.

38. The mower of claim 32 wherein each of the cutting blades is disc-shaped and comprises:
 1) three circumferentially spaced radial cutting arms with each of the cutting arms having a leading edge and a trailing edge;
 2) a centrally located spider wherein the cutting arms i) extend radially outwardly from the spider, ii) are circumferentially spaced, and iii) are disposed along a plane common with the spider;
 3) a cutting notch separating each adjacent pair of the cutting arms wherein each of the cutting notches have a mouth at least about one inch wide;
 4) a cutting edge carried by each leading edge of each of the cutting arms with the cutting edge disposed below the plane of the cutting arms and the spider; and
 5) a flap carried by each trailing edge of each of the cutting arms i) that extends upwardly from the cutting arm and ii) that creates upward cutting suction when the disc-shaped cutting blade is rotated.

39. The mower of claim 38 wherein each of the cutting edges is mounted to its cutting arm by a downwardly inclined tab.

40. The mower of claim 38 comprising three cutting decks and wherein each of the decks comprises three spaced apart disc-shaped cutting blades wherein an outer pair of the disc-shaped cutting blades are forwardly staggered relative to a middle one of the disc-shaped blades.

41. The mower of claim 32 wherein each biasing element comprises a steel coil spring.

42. The mower of claim 32 wherein each biasing element comprises a strut, shock absorber, or gas spring.

43. The mower of claim 32 wherein the cutting blade has a diameter and a spider that is disposed generally in a plane, the spider comprising an upper surface, a lower surface disposed toward the ground, and at least three circumferentially spaced apart cutting arms that extend radially outwardly therefrom, each of the cutting arms comprising a leading edge with a cutting tab that extends downwardly at an angle relative to the plane and which is defined by a generally radially extending bend line and a trailing edge with a flap that extends upwardly at an angle relative to the plane, and each cutting tab comprising a cutting edge disposed along an edge of the cutting tab disposed adjacent the ground, wherein the cutting blade has a weight of at least one pound and eight ounces and has a weight-to-diameter ratio of between about 2.0 ounces per inch of diameter and about 4.5 ounces per inch of diameter, and wherein, during operation, the cutting blade is turned at a rotational speed of at least about 3,500 revolutions per minute and no greater than about 5,000 revolutions per minute such that the velocity of the cutting blade at its outer radial periphery is at least about 14,000 feet per minute and no greater than about 19,000 feet per minute.

44. A mower comprising:
 a) a frame carrying a seat for a driver;
 b) a plurality of wheels carried by the frame with a pair of the wheels disposed adjacent a front end of the mower and a pair of the wheels disposed adjacent a rear end of the mower;
 c) an independent front suspension coupling the front wheels to the frame and comprising 1) a pair of spaced apart control arms with each of the control arms i) coupled adjacent one end thereof to one of the front wheels and ii) having another end pivotally connected to the frame, iii) having a mounting arm extending above the frame, and 2) a biasing element that is located above the frame and that is captured in compression between the mounting arms of the control an-ns wherein the biasing element is constructed and arranged to urge the control arms apart from each other, thereby helping to keep the front wheels in contact with the ground;
 d) at least three cutting decks carried by the frame with each deck having a pair of disc-shaped cutting blades and a discharge;
 e) wherein each of the disc-shaped cutting blades has a diameter of at least nine inches and comprises: 1) a centrally located spider, 2) three circumferentially spaced cutting arms that extend generally radially outwardly from the spider with each of the cutting arms having a leading edge and a trailing edge, 3) a cutting notch separating each adjacent pair of the cutting arms, 4) a cutting edge carried by each leading edge of each of the cutting arms with the cutting edge disposed below the cutting arms and the spider, and 5) a flap carried by each trailing edge of each of the cutting arms that is angled upwardly from the cutting arm such that the flap i) is disposed above the spider and the cutting arms and ii) creates upward cutting suction when the disc-shaped cutting blade is rotated, and wherein each of the disc-shaped cutting blades has a weight-to-diameter ratio of at least about 2.0 ounces per inch of cutting blade diameter, and wherein, during operation, each cutting blade is turned at a rotational speed of between about 3,000 revolutions per minute and about 5,000 revolutions per minute such that the velocity of the cutting blade at its outer radial periphery is at least about 14,000 feet per minute and no greater than about 19,000 feet per minute;
 e) a prime mover comprising an internal combustion engine carried by the frame that is operably coupled to the blade for rotating the blade and that is operably coupled to the rear wheels for rotating the wheels, wherein the internal combustion engine has a horsepower rating of between twenty and thirty-five horsepower.

45. The mower of claim 44 wherein the internal combustion engine has a rotary shaft coupled by a transfer case to a second shaft that is coupled to one of the cutting decks.

46. The mower of claim 44 wherein the independent front suspension comprises a pair of the biasing elements arranged in a criss-cross arrangement.

47. The mower of claim 44 wherein the biasing element comprises a strut, shock absorber or gas spring.

48. The mower of claim 44 wherein each cutting deck comprises a top wall, a sidewall extending downwardly from the top wall, a discharge, and a baffle inside the deck disposed between the discharge and the cutting blades, the baffle comprises a top edge that is spaced from an interior surface of the top wall of the deck defining a discharge aperture between the discharge and the cutting blades, and the baffle, top wall, and sidewall define a cutting chamber within which the cutting blades are disposed.

49. The mower of claim 48 wherein the discharge of each cutting deck faces forwardly.

50. A mower comprising:
 a) a frame;
 b) a plurality of wheels carried by the frame with at least one of the wheels disposed adjacent a front end of the mower and at least one of the wheels disposed adjacent a rear end of the mower;

c) a cutting deck carried by the frame;

d) a rotatable cutting blade housed within the deck; and e) a motor carried by the frame and operably coupled to the cutting blade; and f) wherein the cutting deck comprises a top wall, a sidewall extending downwardly from the top wall, a front-facing discharge, and a baffle inside the deck disposed between the discharge and the cutting blade, the baffle having a top edge that is spaced from an interior surface of the top wall of the deck to define a discharge aperture between the front-facing discharge and the cutting blade, and wherein the baffle, top wall, and sidewall define a cutting chamber within which the cutting blade is disposed.

51. The mower of claim 50 wherein the cutting blade has a diameter and a generally disc-shaped metallic body that is disposed generally in a plane when it is rotated, the disc-shaped body comprising an upper surface, a lower surface disposed toward the ground, and at least three circumferentially spaced apart cutting arms that extend radially outwardly from the disc-shaped body, each of the cutting arms comprising a leading edge with a cutting tab that extends downwardly at an angle relative to the plane in which the disc-shaped body is disposed when it is rotated and a trailing edge with a flap that extends upwardly at an angle relative to the plane, and each cutting tab comprising a cutting edge disposed along an edge of cutting tab disposed adjacent the ground, wherein the cutting blade has a weight-to-diameter ratio of between about 2.0 ounces per inch of diameter and about 4.5 ounces per inch of diameter, and wherein, during operation, the cutting blade is turned at a rotational speed of between about 3,000 revolutions per minute and about 5,000 revolutions per minute such that the velocity of the cutting blade at its outer radial periphery is at least about 14,000 feet per minute and no greater than about 19,000 feet per minute.

52. The mower of claim 50 further comprising a seat for a driver, a pair of spaced apart wheels adjacent the front of the mower, and an independent front suspension coupling the pair of spaced apart wheels to the frame, the independent front suspension comprising 1) a pair of spaced apart control arms each i) having one end receiving one of the front wheels and ii) having another end pivotally connected to the frame, and 2) a pair of biasing elements i) each in operable communication with both of the control arms, ii) that are each disposed between the control arms urging the control arms apart from each other, and iii) that are arranged in a criss-cross pattern.

53. A mower comprising:

a) a frame carrying a seat for a driver;

b) a plurality of wheels carried by the frame with a pair of the wheels disposed adjacent a front end of the mower and a pair of the wheels disposed adjacent a rear end of the mower;

c) an independent suspension coupling one pair of the wheels to the frame and comprising 1) a pair of spaced apart control arms with each of the control arms i) operably coupled adjacent one end thereof to one of the front wheels and ii) having another end pivotally connected to the frame, and 2) a pair of biasing elements operably connected to the control arms and arranged in a criss-cross relationship relative to one another;

d) at least three cutting decks carried by the frame with each cutting deck having at least two disc-shaped cutting blades and a discharge;

e) wherein each of the disc-shaped cutting blades comprises three circumferentially spaced cutting arms that extend generally radially outwardly with each of the cutting arms having a leading edge and a trailing edge, a notch separating each adjacent pair of the cutting arms, a cutting edge carried by each leading edge of each of the cutting arms with the cutting edge disposed below the cutting arms and the spider, and wherein, during operation, each cutting blade is turned at a rotational speed of between about 3,500 revolutions per minute and about 5,000 revolutions per minute such that the velocity of the cutting blade at its outer radial periphery is at least about 14,000 feet per minute and no greater than about 19,000 feet per minute;

f) a prime mover comprising an internal combustion engine that is carried by the frame that is operably coupled to each cutting blade for rotating each cutting blade and that is operably coupled to another pair of the wheels for rotating the another pair of the wheels.

54. The mower of claim 53 wherein each cutting blade has a weight of at least one pound and eight ounces and has a weight-to-diameter ratio of between about 2.0 ounces per inch of diameter and about 4.5 ounces per inch of diameter.

55. The mower of claim 53 wherein each cutting deck comprises a top wall, a sidewall extending downwardly from the top wall, a discharge, and a baffle inside the deck disposed between the discharge and the cutting blades, the baffle comprises a top edge that is spaced from an interior surface of the top wall of the deck defining a discharge aperture between the discharge and the cutting blades, and the baffle, top wall, and sidewall define a cutting chamber within which the cutting blades are disposed.

56. The mower of claim 55 wherein the discharge of each cutting deck faces forwardly.

57. The mower of claim 53 wherein each biasing element comprises a steel coil spring.

58. The mower of claim 53 wherein each biasing element comprises a strut, shock absorber, or gas spring.

59. The mower of claim 53 wherein the frame comprises a longitudinally extending support beam and the pair of biasing elements overlie the support beam.

60. The mower of claim 53 wherein the support beam has pocket and further comprising a rotary shaft extending from the internal combustion engine that is coupled to one of the cutting decks for rotating to cutting blades of the one of the cutting decks, wherein the rotary shaft is received in the pocket in the support beam.

* * * * *